(12) United States Patent
Fujisaki

(10) Patent No.: US 9,335,528 B2
(45) Date of Patent: May 10, 2016

(54) ZOOM LENS AND IMAGE PICKUP APPARATUS INCLUDING THE SAME

(71) Applicant: CANON KABUSHIKI KAISHA, Tokyo (JP)

(72) Inventor: Toyokatsu Fujisaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 86 days.

(21) Appl. No.: 14/470,209

(22) Filed: Aug. 27, 2014

(65) Prior Publication Data

US 2015/0062385 A1 Mar. 5, 2015

(30) Foreign Application Priority Data

Aug. 28, 2013 (JP) ................................. 2013-176641

(51) Int. Cl.
  *G02B 15/14* (2006.01)
  *G02B 15/173* (2006.01)
(52) U.S. Cl.
  CPC .............. *G02B 15/173* (2013.01); *G02B 15/14* (2013.01)
(58) Field of Classification Search
  CPC ............................. G02B 12/173; G02B 15/14
  USPC ......................................... 359/676; 348/240.3
  See application file for complete search history.

(56) References Cited

U.S. PATENT DOCUMENTS

| | | | | |
|---|---|---|---|---|
| 2010/0271710 A1* | 10/2010 | Ohashi | ............... | G02B 27/0025 359/687 |
| 2011/0026133 A1* | 2/2011 | Fujisaki | ............... | G02B 13/009 359/683 |
| 2011/0080653 A1* | 4/2011 | Kimura | ............... | G02B 15/173 359/683 |
| 2011/0141577 A1* | 6/2011 | Kimura | ............... | G02B 15/173 359/683 |
| 2011/0317280 A1* | 12/2011 | Saito | ................. | G02B 15/173 359/687 |
| 2012/0087016 A1* | 4/2012 | Ito | ...................... | G02B 15/173 359/684 |
| 2012/0087017 A1* | 4/2012 | Fujisaki | ............... | G02B 13/009 359/687 |
| 2013/0208364 A1* | 8/2013 | Ito | ...................... | G02B 15/14 359/690 |
| 2013/0308043 A1* | 11/2013 | Ito | ...................... | G02B 15/14 348/360 |
| 2014/0043692 A1* | 2/2014 | Mogi | .................. | G02B 15/14 359/683 |

FOREIGN PATENT DOCUMENTS

| | | |
|---|---|---|
| JP | 2003-255228 A | 9/2003 |
| JP | 2006-171655 A | 6/2006 |

\* cited by examiner

*Primary Examiner* — Bumsuk Won
*Assistant Examiner* — Grant Gagnon
(74) *Attorney, Agent, or Firm* — Canon USA Inc. IP Division

(57) ABSTRACT

A zoom lens includes, in order from an object side to an image side, a first lens unit having positive refractive power, a second lens unit having negative refractive power, a third lens unit having positive refractive power, a fourth lens unit having negative refractive power, and a fifth lens unit having positive refractive power. At least the first, second, and third lens units move during zooming so that the first lens unit is located closer to an object side than an image side, the second lens unit is located closer to the image side, and the third lens unit is located closer to the object side at a telephoto end than a wide-angle end. Movement, focal length, and positioning parameters of first to third lens units, during zooming from the wide-angle end toward the telephoto end, are appropriately set based on mathematical conditions.

12 Claims, 21 Drawing Sheets

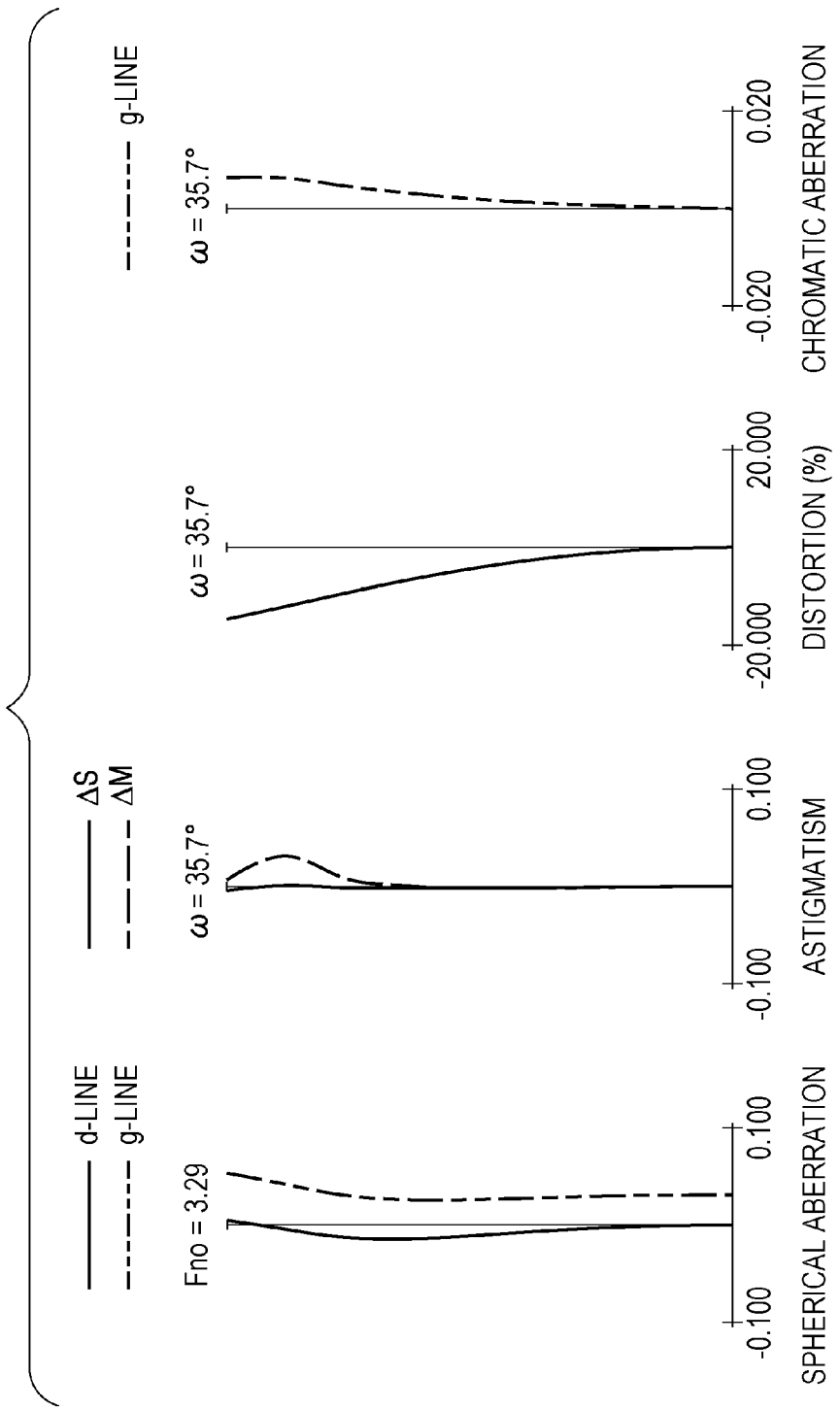

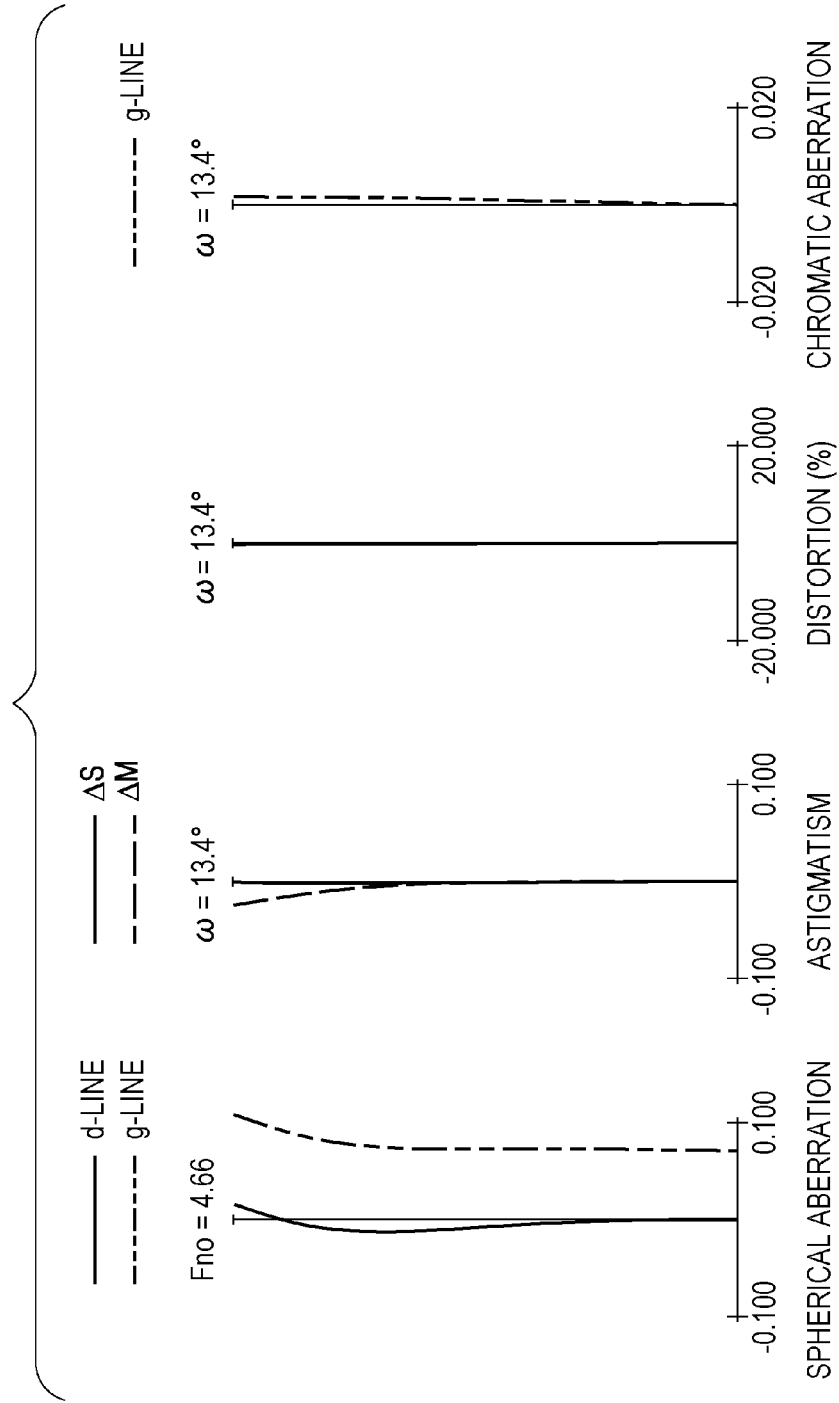

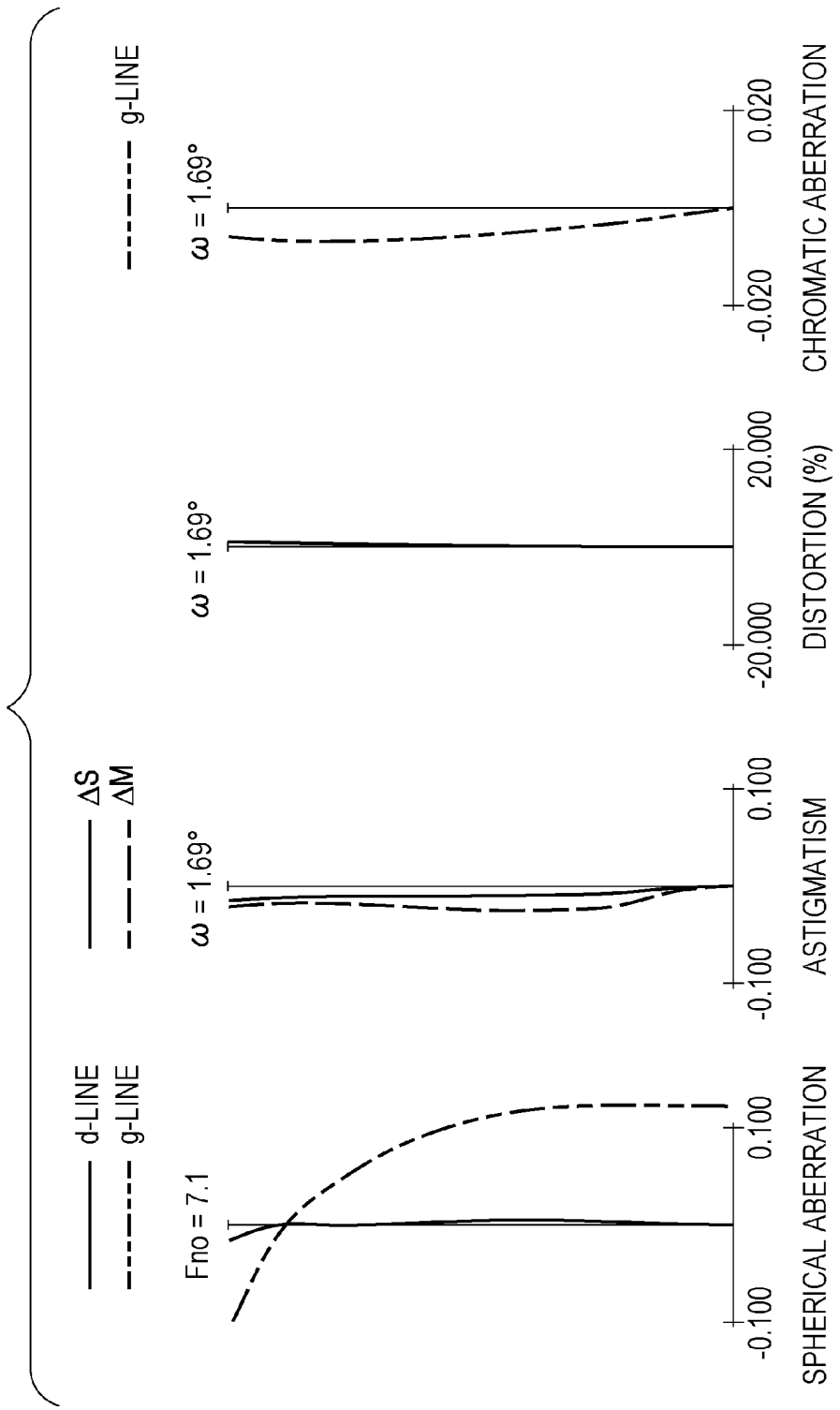

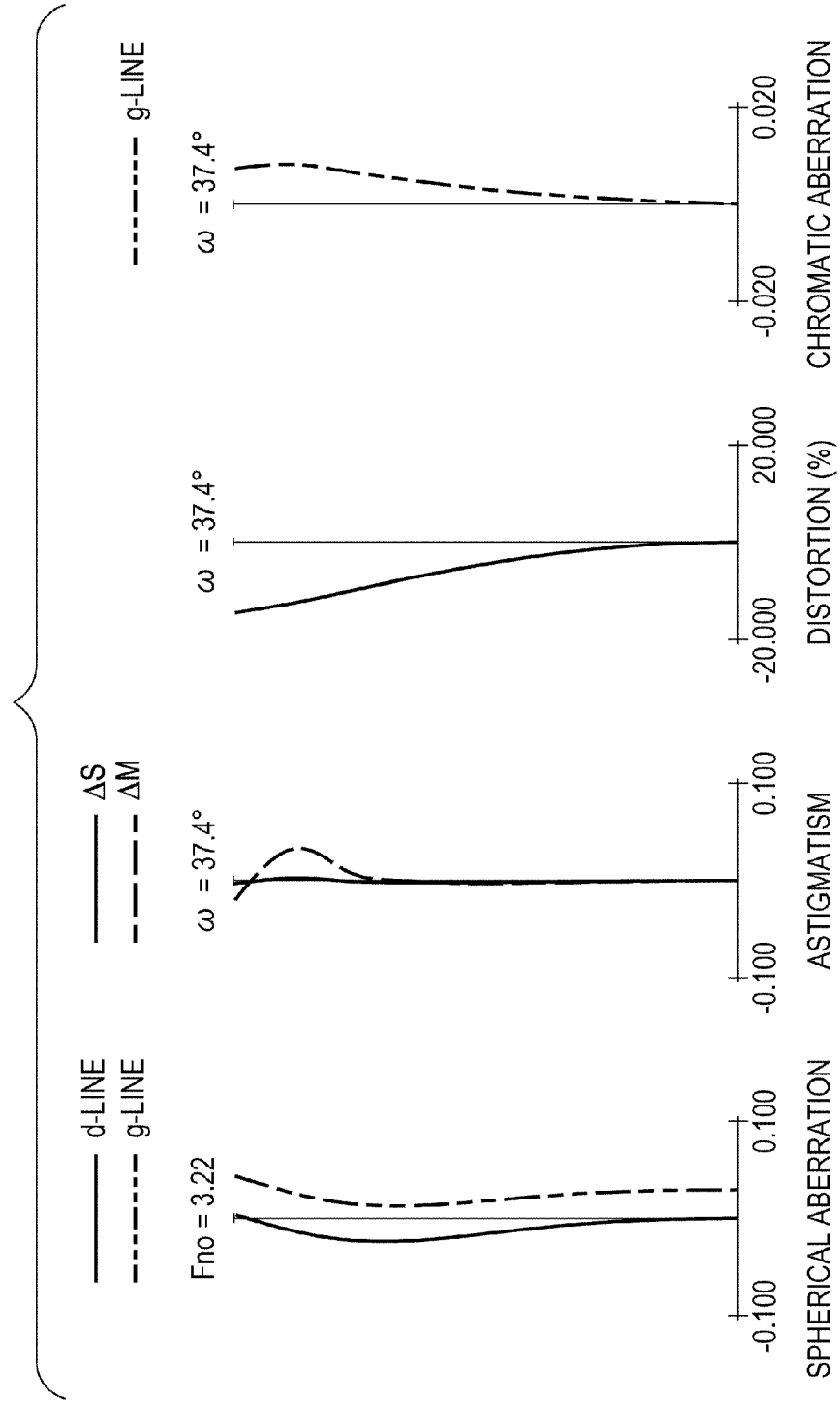

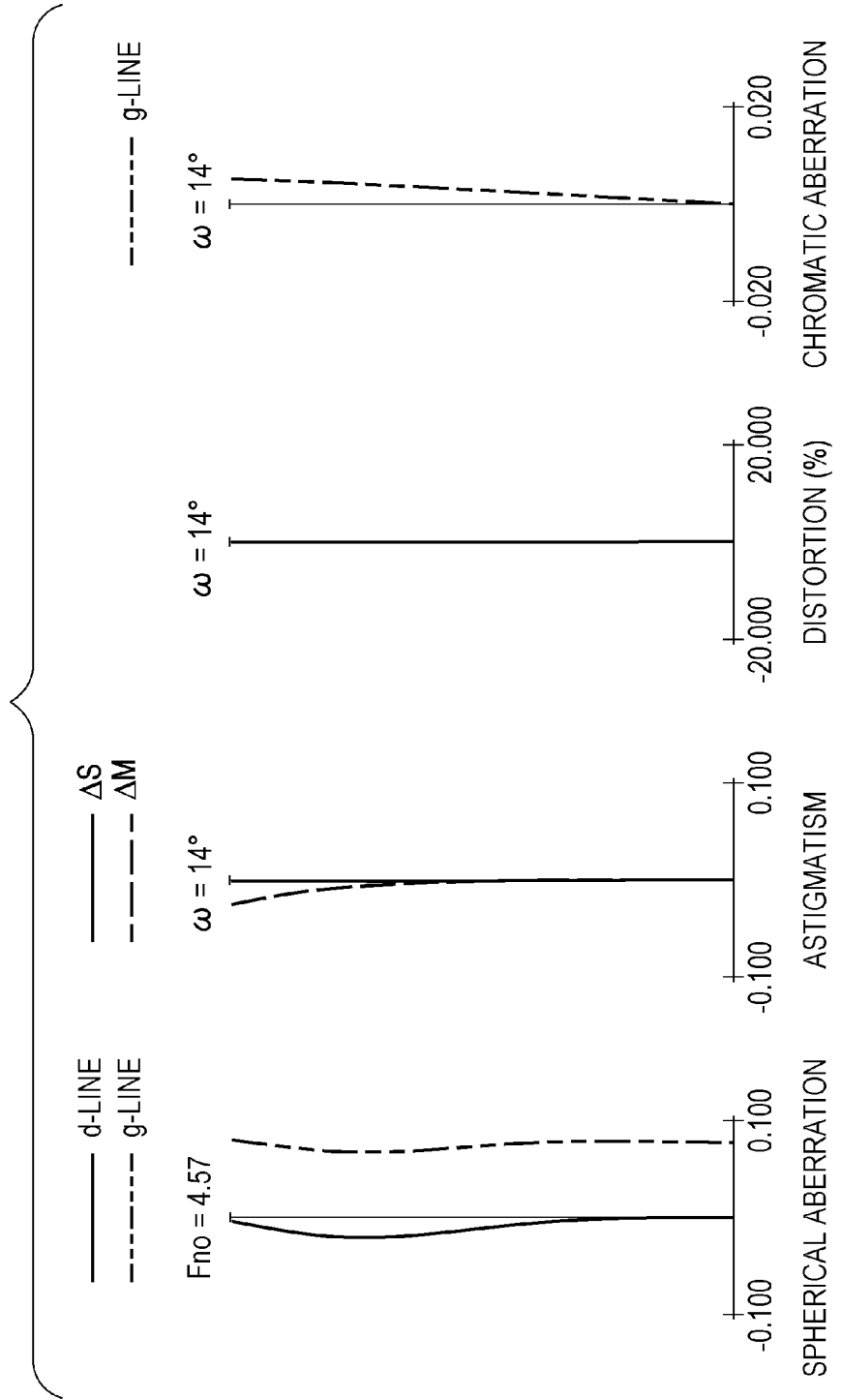

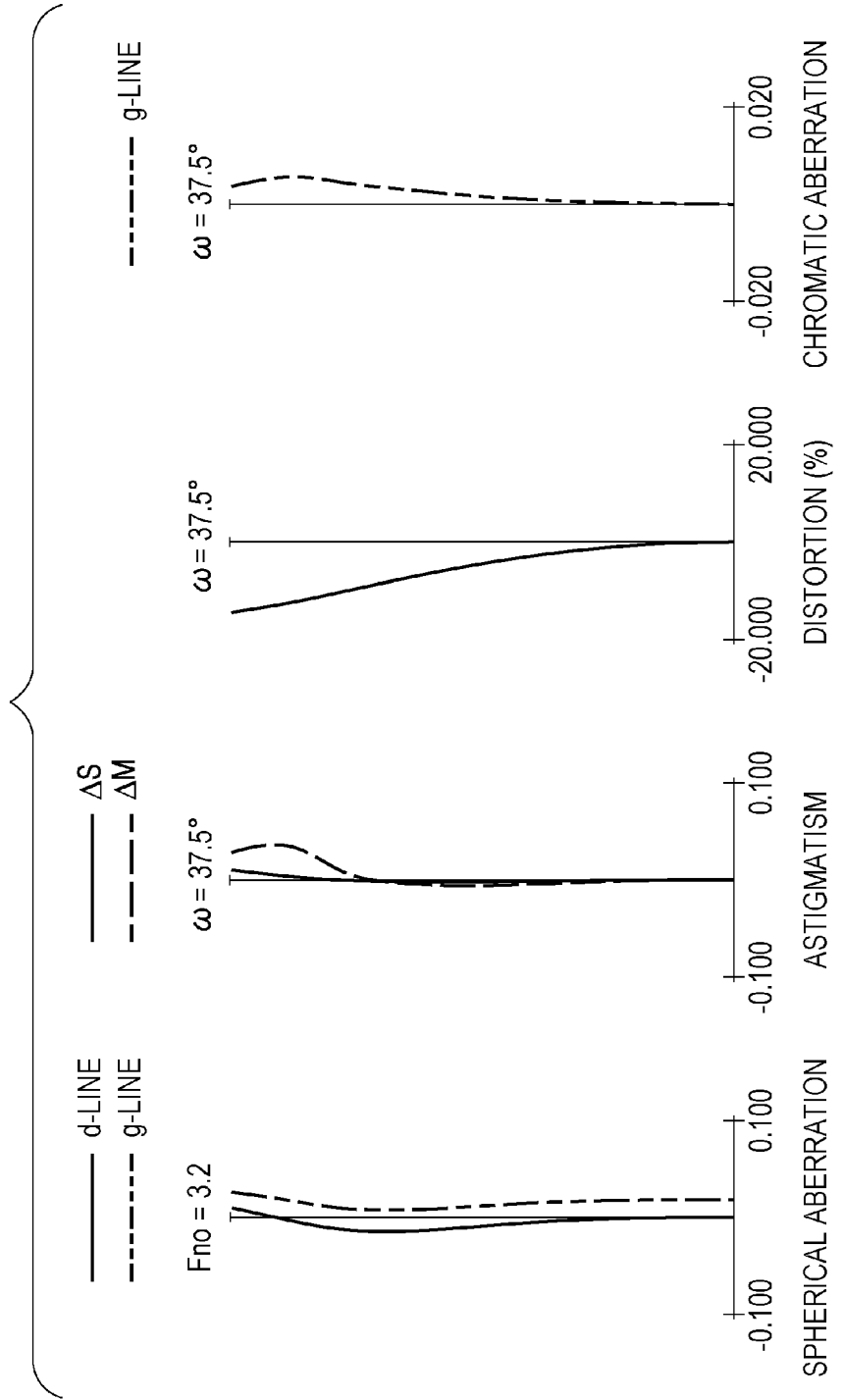

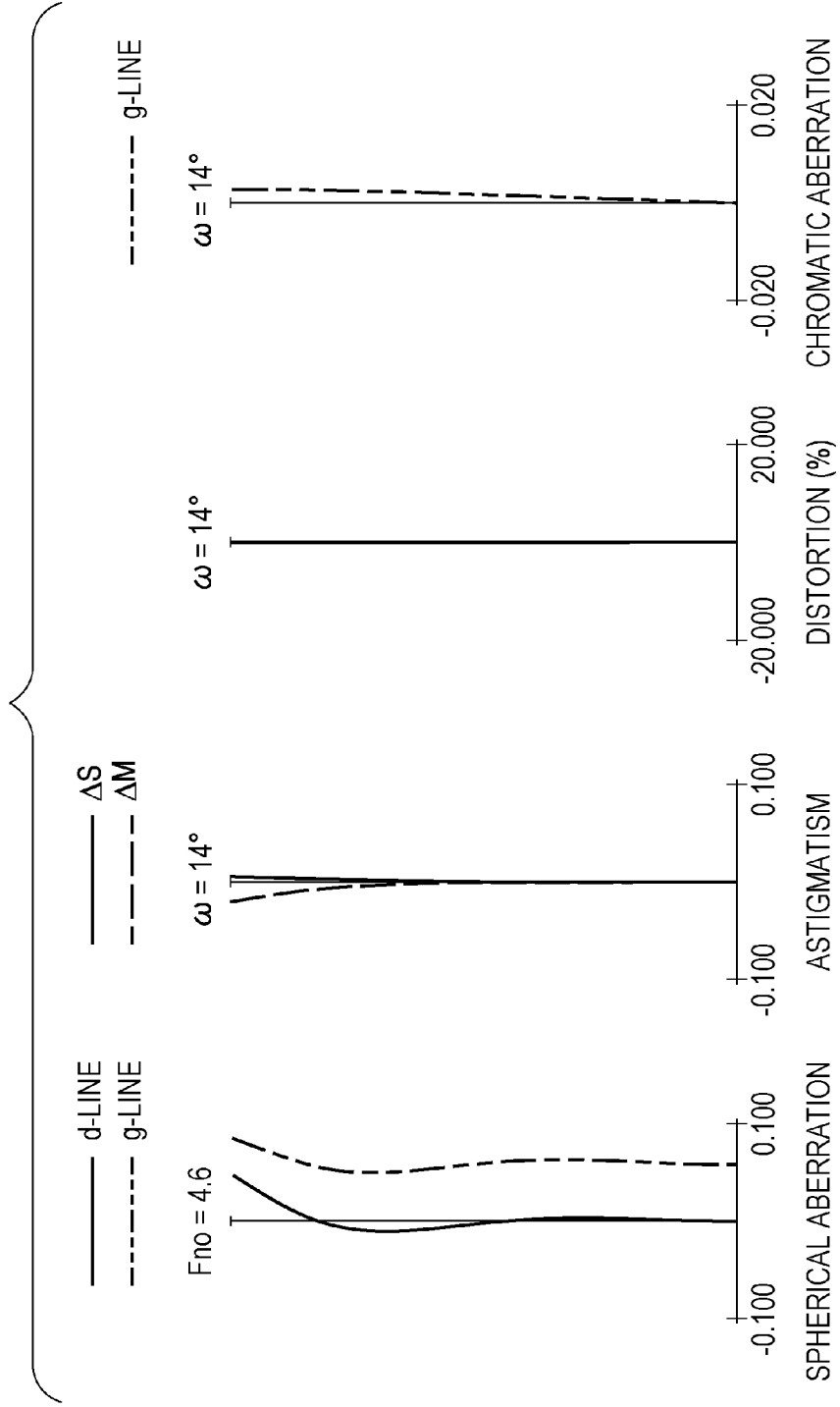

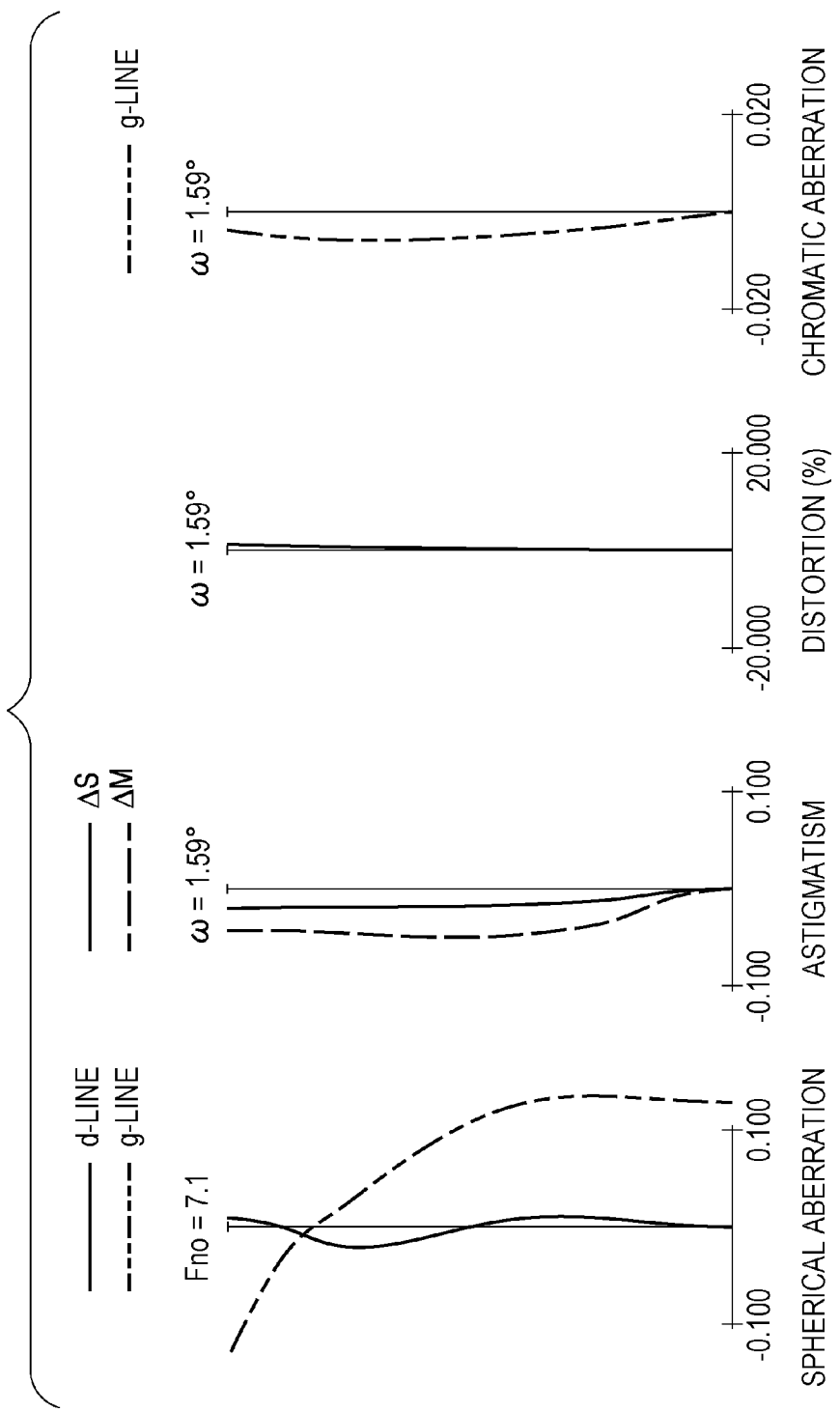

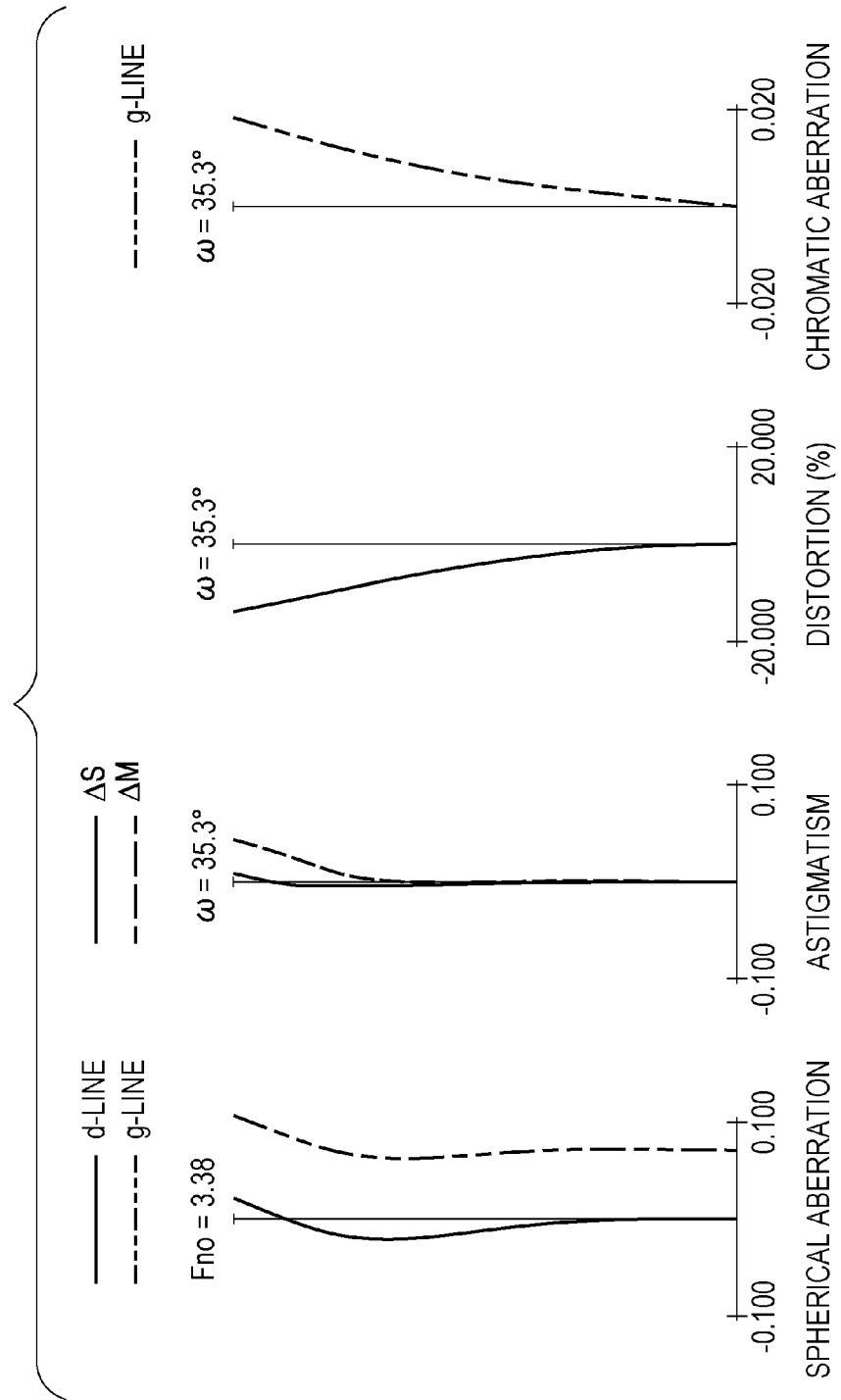

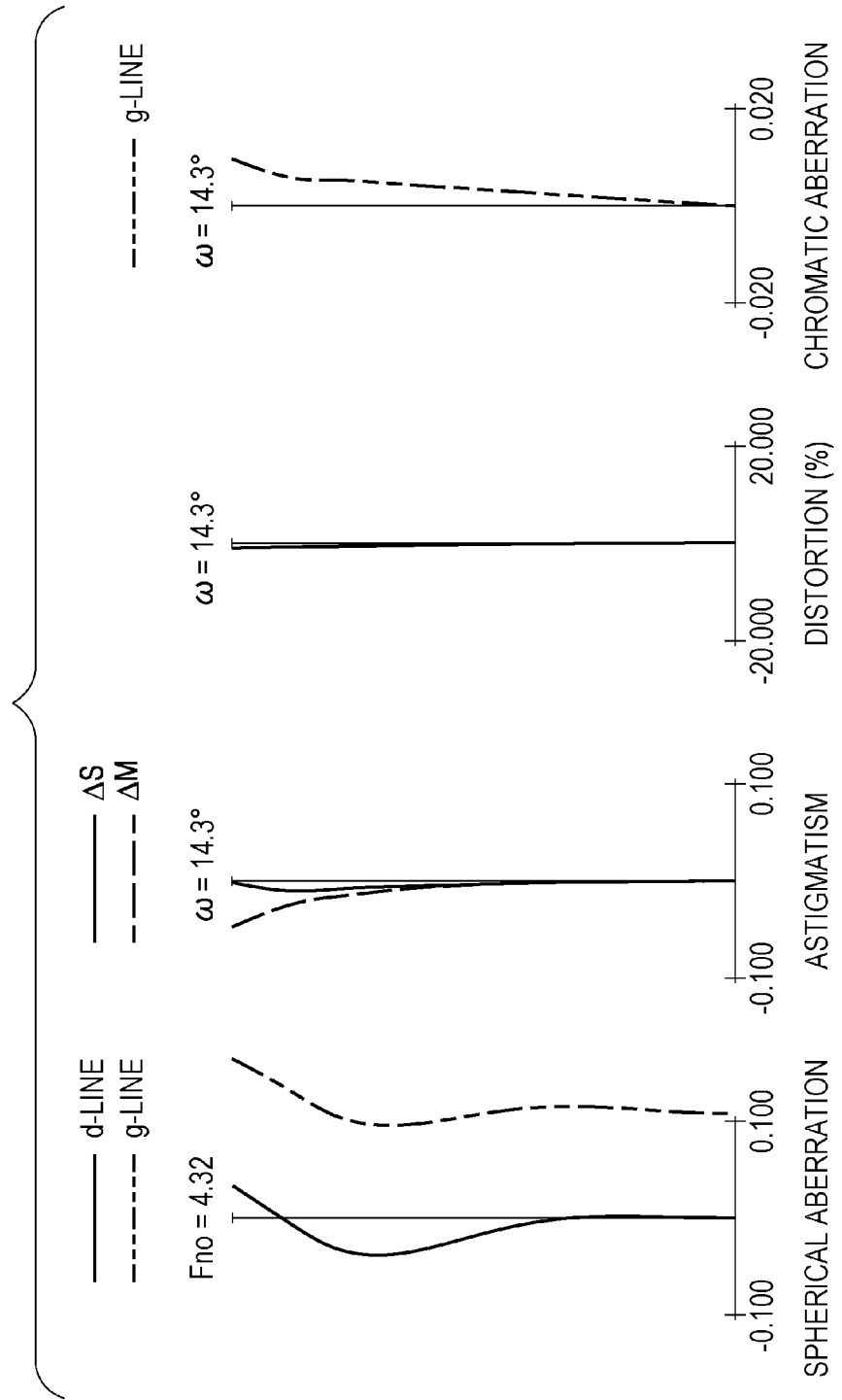

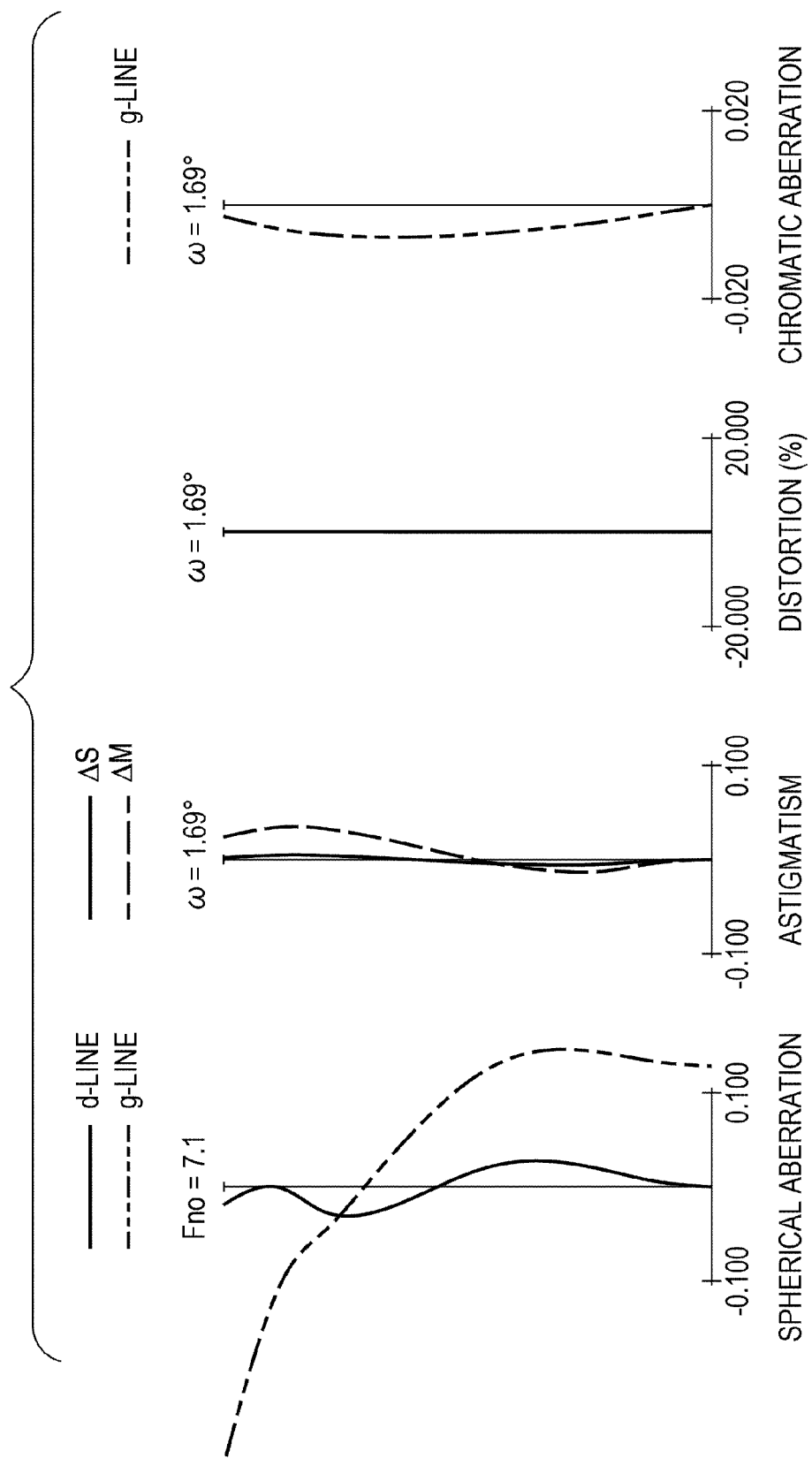

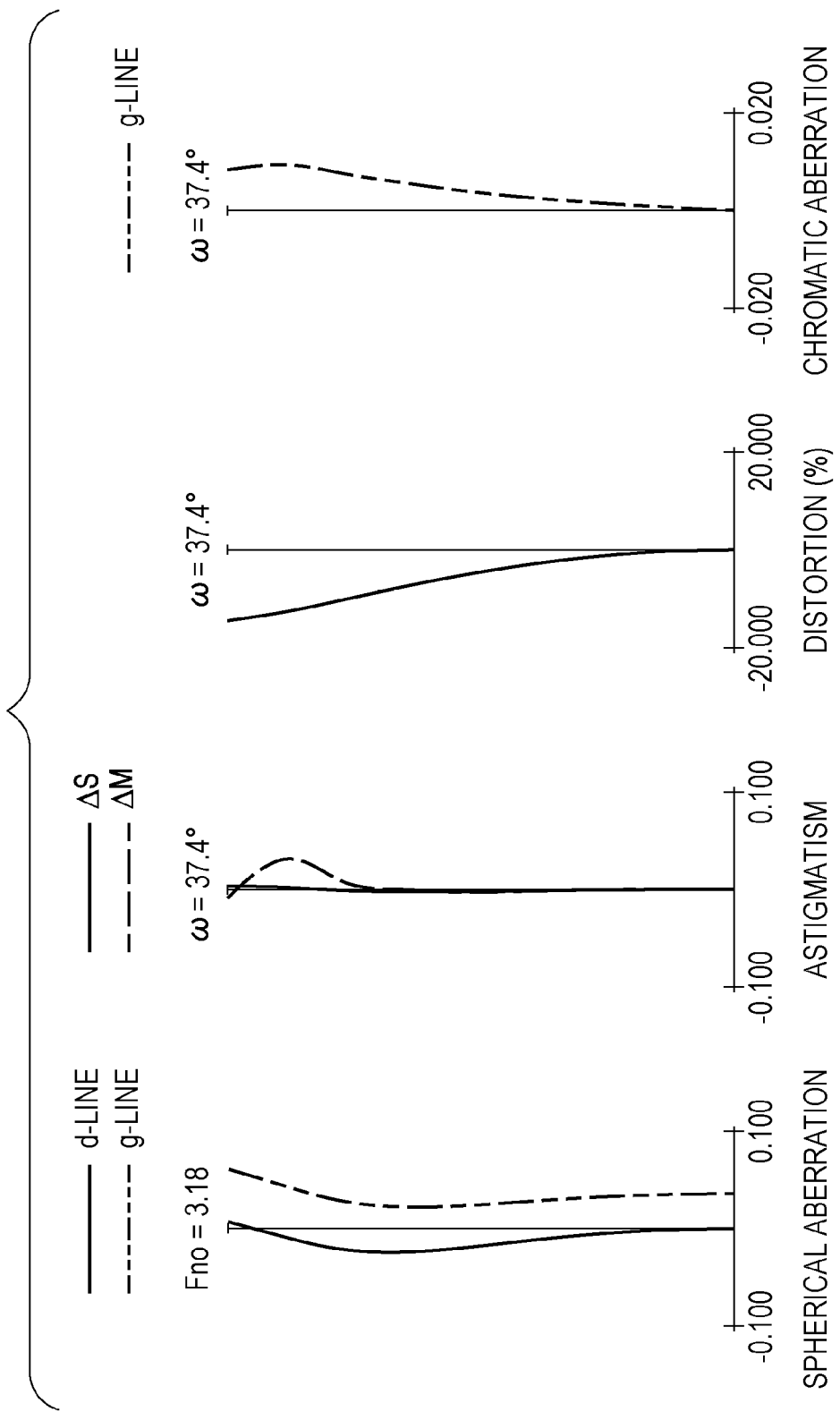

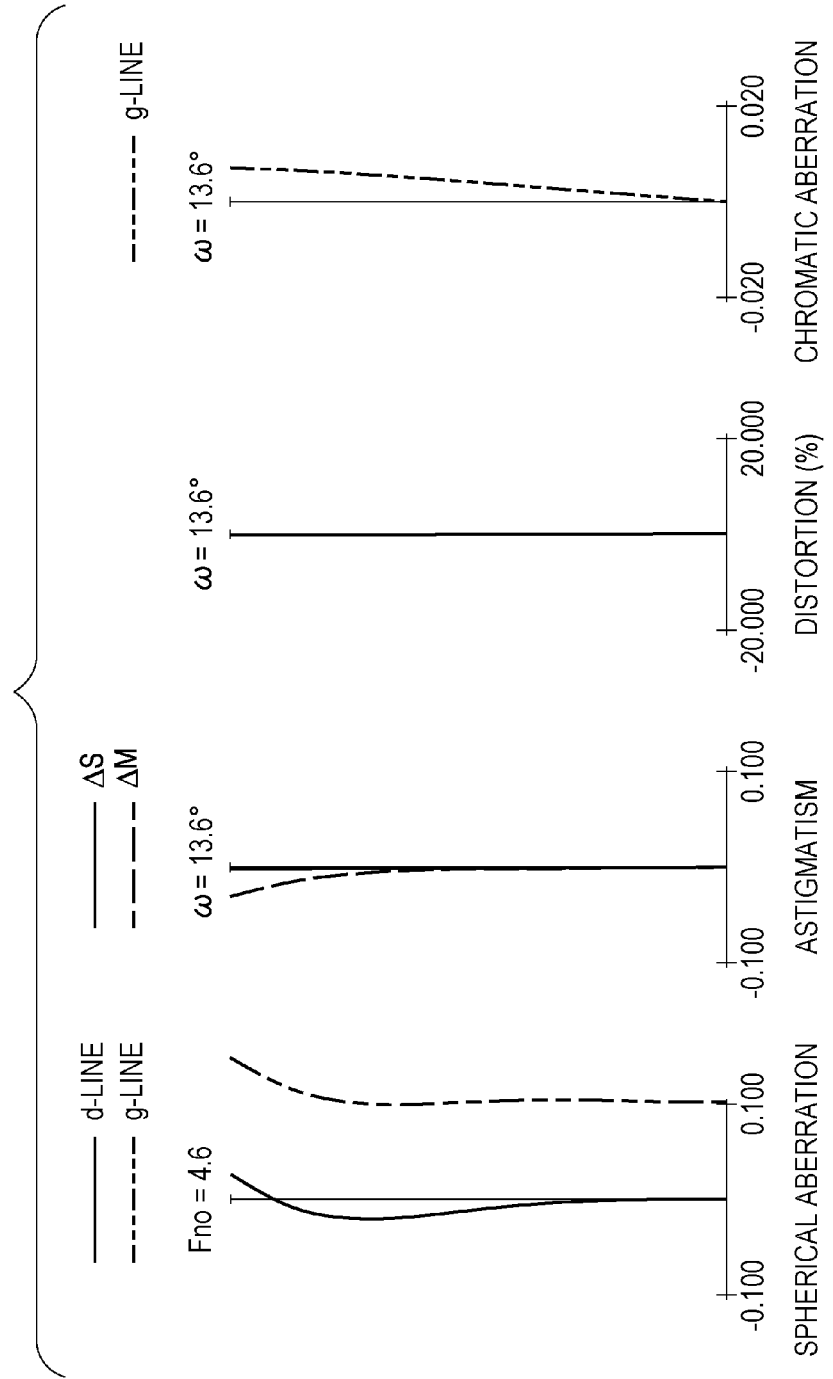

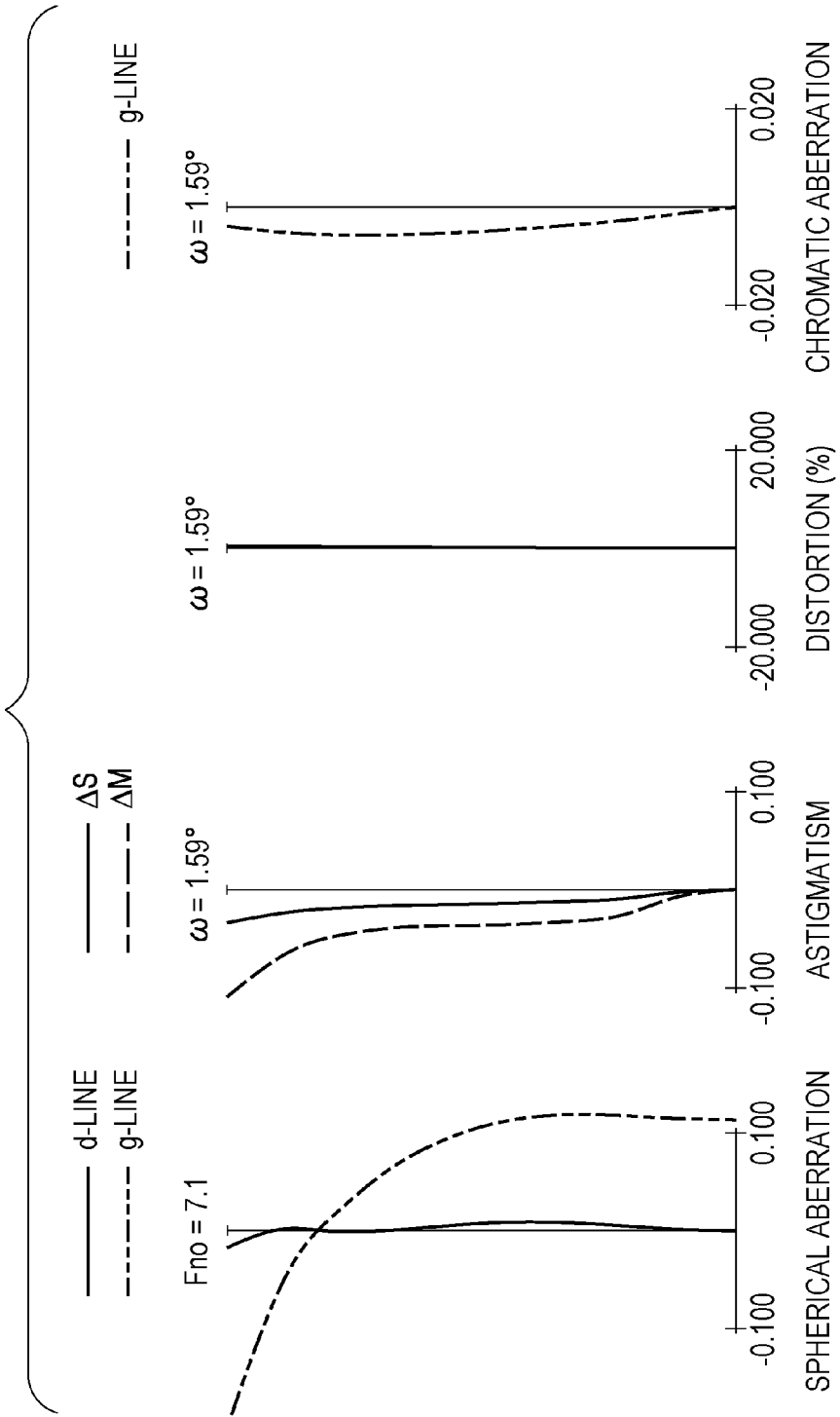

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same. The present invention is suitable for image pickup apparatuses that use an image sensor, such as a digital still camera, a video camera, a monitoring camera, or a broadcasting camera, and image pickup apparatuses, such as a camera that uses silver-halide film.

2. Description of the Related Art

Image pickup apparatuses, such as a digital still camera and a video camera, that use a solid-state image sensor have recently increased in performance and decreased in size. To that end, zoom lenses for use in such apparatuses are required to have a short overall lens length and high magnification ratios. As a zoom lens that meets such requirements, a positive-lead type lens is known in which a lens unit having positive refractive power is disposed closest to an object side.

Japanese Patent Application Laid-Open No. 2006-171655 discloses a four-unit zoom lens which consists of lens units having positive, negative, positive, and positive refractive power in this order from an object side to an image side, and a five-unit zoom lens which consists of lens units having positive, negative, positive, positive, and positive refractive power in this order from the object side to the image side. Japanese Patent Application Laid-Open No. 2003-255228 discloses a five-unit zoom lens which consists of lens units having positive, negative, positive, negative, and positive refractive power in this order from the object side to the image side. In a zoom lens disclosed in Japanese Patent Application Laid-Open No. 2006-171655, the first to fourth lens units are moved for zooming. In a zoom lens disclosed in Japanese Patent Application Laid-Open No. 2003-255228, the first to fifths lens units are moved for zooming.

In general, to obtain a compact, high-magnification image-pickup optical system, the number of lenses that constitute individual lens units is reduced while the refractive power of the individual lens units constituting the image-pickup optical system is increased. However, increasing the refractive power of the lens units increases the refractive power of the surfaces of the lenses, resulting in an increase in the thicknesses of the lenses to ensure sufficient edge thicknesses of the lenses. This increases the effective diameter of a front lens, thus making it difficult to obtain a compact image-pickup optical system. Furthermore, this causes various aberrations, such as chromatic aberration at a telephoto end, which are difficult to correct.

SUMMARY OF THE INVENTION

According to one embodiment of the present invention, a zoom lens includes, in order from an object side to an image side, a first lens unit having positive refractive power, a second lens unit having negative refractive power, a third lens unit having positive refractive power, a fourth lens unit having negative refractive power, and a fifth lens unit having positive refractive power, wherein at least the first lens unit, the second lens unit, and the third lens unit move during zooming so that the first lens unit is located closer to an object side, the second lens unit is located closer to an image side, and the third lens unit is located closer to the object side at a telephoto end than a wide-angle end, wherein the following conditional expressions are satisfied:

$0.05 < Tdw/ft < 0.55$ $5.0 < f1/fw < 10.0$ $-5.00 < M1/M2 < -0.05$ where Tdw is an overall lens length at the wide-angle end, M1 is the amount of movement of the first lens unit during zooming from the wide-angle end toward the telephoto end, M2 is the amount of movement of the second lens unit during zooming from the wide-angle end toward the telephoto end, f1 is the focal length of the first lens unit, fw is the focal length of the entire lens at the wide-angle end, and ft is the focal length of the entire lens at the telephoto end; and the sign of the amounts of movement of the lens units is positive when the lens units are moved to be located closer to the object side at the telephoto end than the wide-angle end, and is negative when the lens units are moved to be located closer to the image side at the telephoto end than the image side.

Further features of the present invention will become apparent from the following description of exemplary embodiments with reference to the attached drawings.

BRIEF DESCRIPTION OF THE DRAWINGS

FIG. 2A is an aberration diagram of the zoom lens at the wide-angle end, according to the first embodiment.

FIG. 2B is an aberration diagram of the zoom lens at an intermediate zooming position, according to the first embodiment.

FIG. 2C is an aberration diagram of the zoom lens at a telephoto end, according to the first embodiment.

FIG. 4A is an aberration diagram of the zoom lens at the wide-angle end, according to the second embodiment.

FIG. 4B is an aberration diagram of the zoom lens at the intermediate zooming position, according to the second embodiment.

FIG. 6A is an aberration diagram of the zoom lens at the wide-angle end, according to the third embodiment.

FIG. 6B is an aberration diagram of the zoom lens at the intermediate zooming position, according to the third embodiment.

FIG. 6C is an aberration diagram of the zoom lens at the telephoto end, according to the third embodiment.

FIG. 8A is an aberration diagram of the zoom lens at the wide-angle end, according to the fourth embodiment.

FIG. 8B is an aberration diagram of the zoom lens at the intermediate zooming position, according to the fourth embodiment.

FIG. 8C is an aberration diagram of the zoom lens at the telephoto end, according to the fourth embodiment.

FIG. 10A is an aberration diagram of the zoom lens at the wide-angle end, according to the fifth embodiment.

FIG. 10B is an aberration diagram of the zoom lens at the intermediate zooming position, according to the fifth embodiment.

FIG. 10C is an aberration diagram of the zoom lens at the telephoto end, according to the fifth embodiment.

DESCRIPTION OF THE EMBODIMENTS

Zoom lenses and image pickup apparatuses including the same in some embodiments of the present invention will now be described in detail with reference to the drawings. Zoom lenses in some embodiments of the present invention include, in order from an object side to an image side, a first lens unit having positive refractive power, a second lens unit having negative refractive power, a third lens unit having positive refractive power, a fourth lens unit having negative refractive power, and a fifth lens unit having positive refractive power. Specifically, zoom lenses according to first to fourth embodiments each consist of, in order from the object side to the image side, a first lens unit having positive refractive power, a second lens unit having negative refractive power, a third lens unit having positive refractive power, a fourth lens unit having negative refractive power, and a fifth lens unit having positive refractive power. A zoom lens according to a fifth embodiment consists of, in order from the object side to the image side, a first lens unit having positive refractive power, a second lens unit having negative refractive power, a third lens unit having positive refractive power, a fourth lens unit having negative refractive power, a fifth lens unit having positive refractive power, and a sixth lens unit having positive refractive power.

Figure 1:
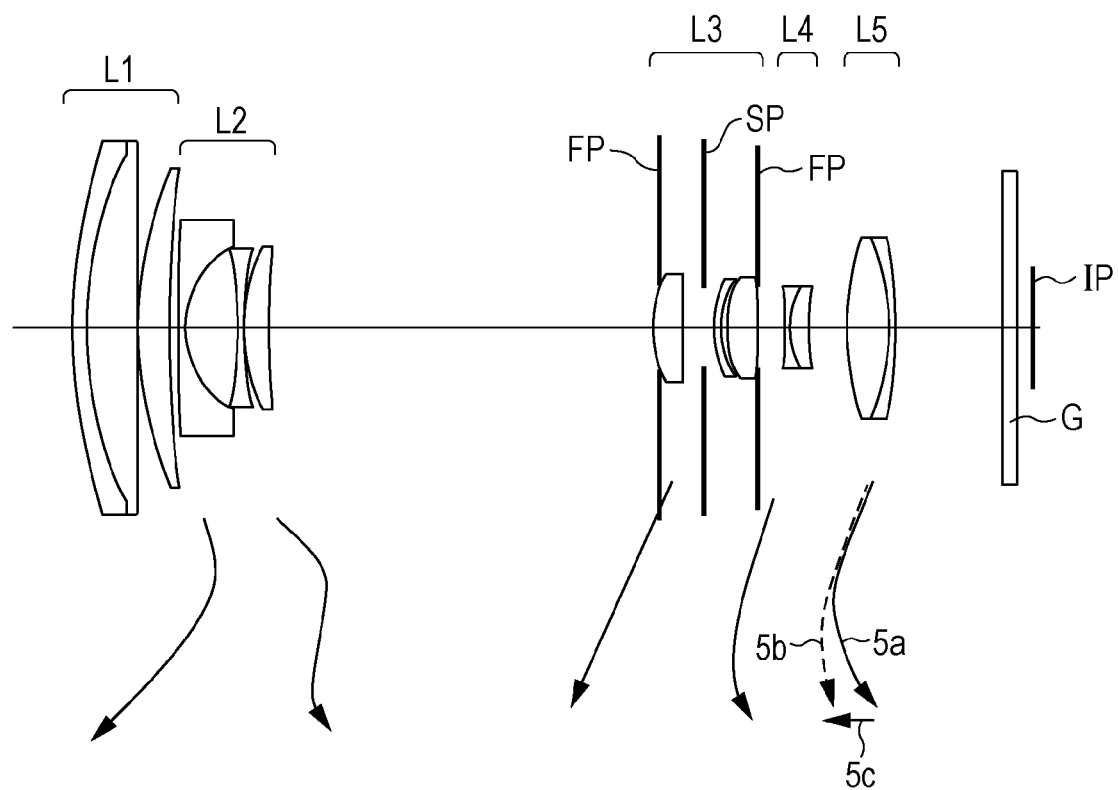
FIG. 1 is a cross-sectional view of a zoom lens at a wide-angle end, according to a first embodiment.
Figure 3:
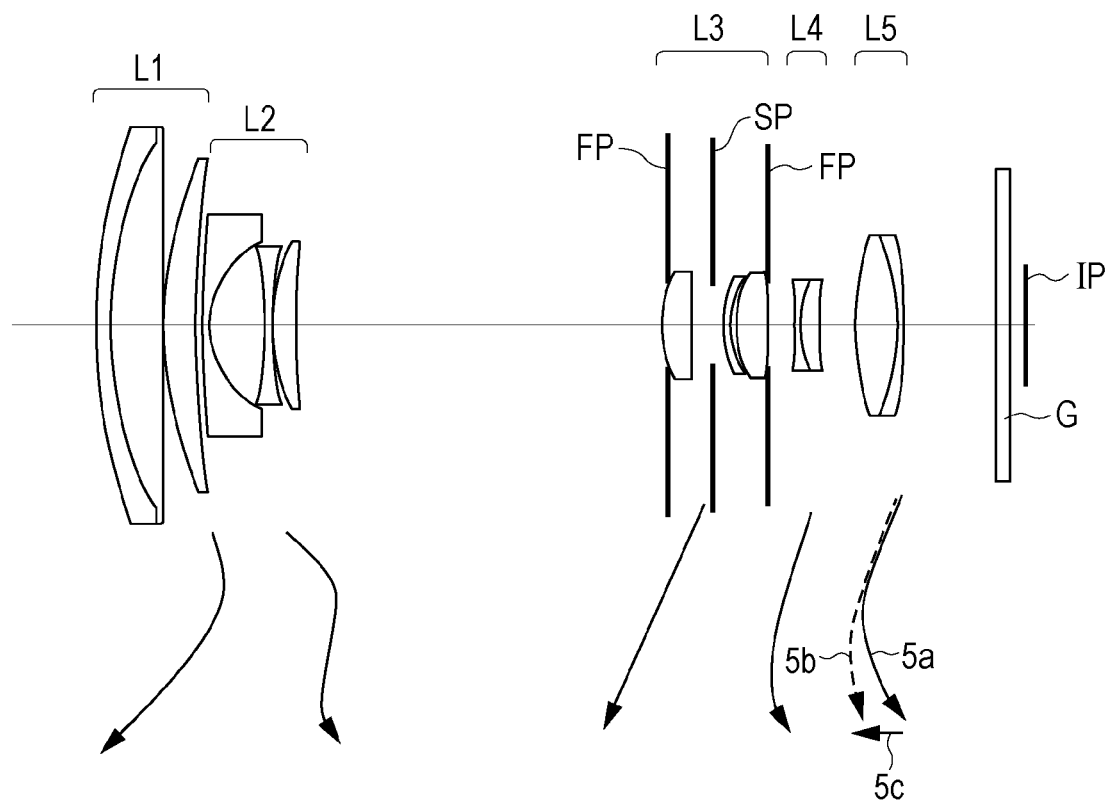
FIG. 3 is a cross-sectional view of a zoom lens at the wide-angle end, according to a second embodiment.
Figure 4C:
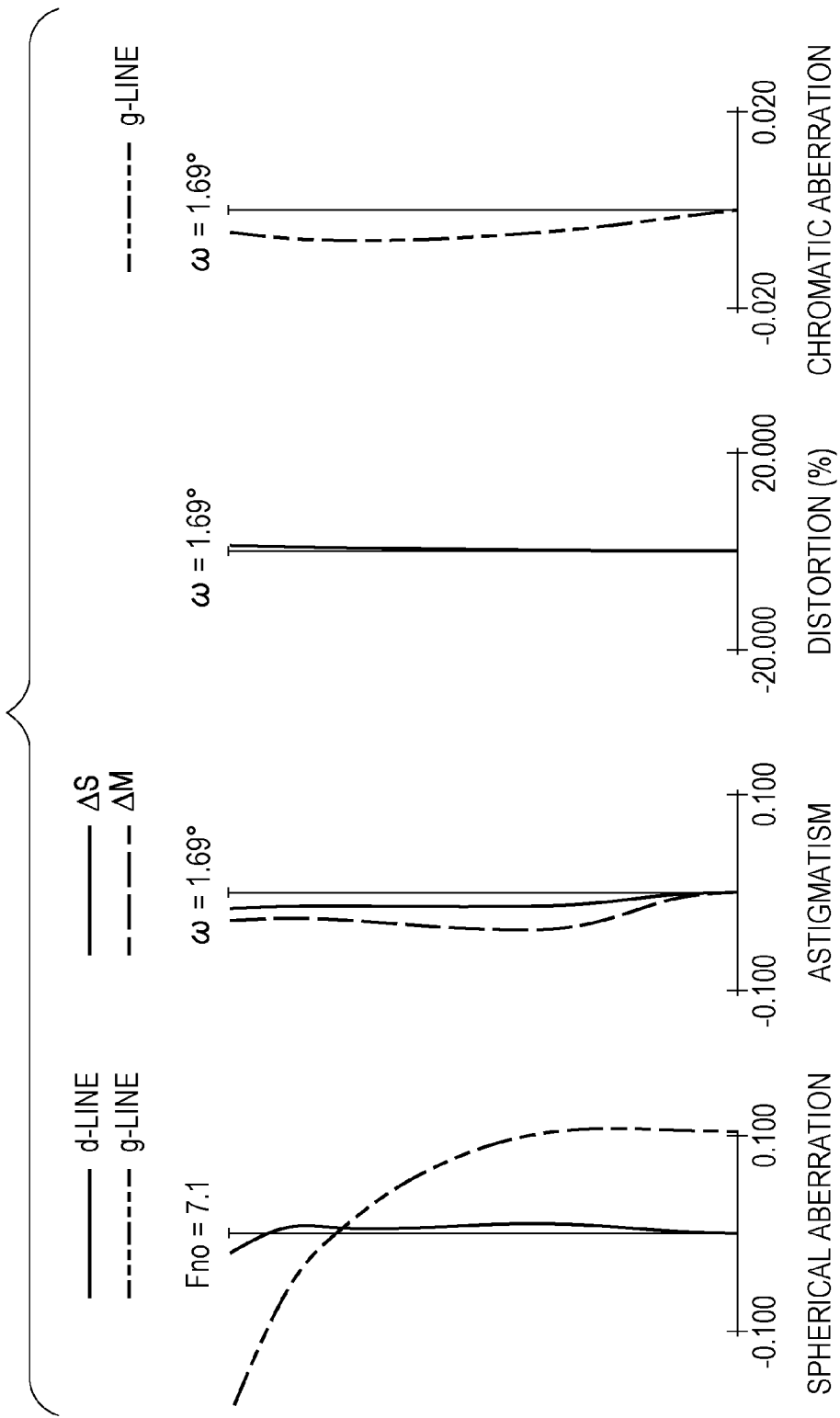
FIG. 4C is an aberration diagram of the zoom lens at the telephoto end, according to the second embodiment.

FIG. 1 is a cross-sectional view of the zoom lens of the first embodiment at the wide-angle end. FIGS. 2A, 2B, and 2C are aberration diagrams of the zoom lens of the first embodiment at the wide-angle end, an intermediate zooming position, and the telephoto end, respectively. The first embodiment is a zoom lens having a zoom ratio of 28.41 and an aperture ratio of about 3.29 to 7.10. FIG. 3 is a cross-sectional view of the zoom lens of the second embodiment at the wide-angle end. FIGS. 4A, 4B, and 4C are aberration diagrams of the zoom lens of the second embodiment at the wide-angle end, the intermediate zooming position, and the telephoto end, respectively. The second embodiment is a zoom lens having a zoom ratio of 30.21 and an aperture ratio of about 3.22 to 7.10.

Figure 5:
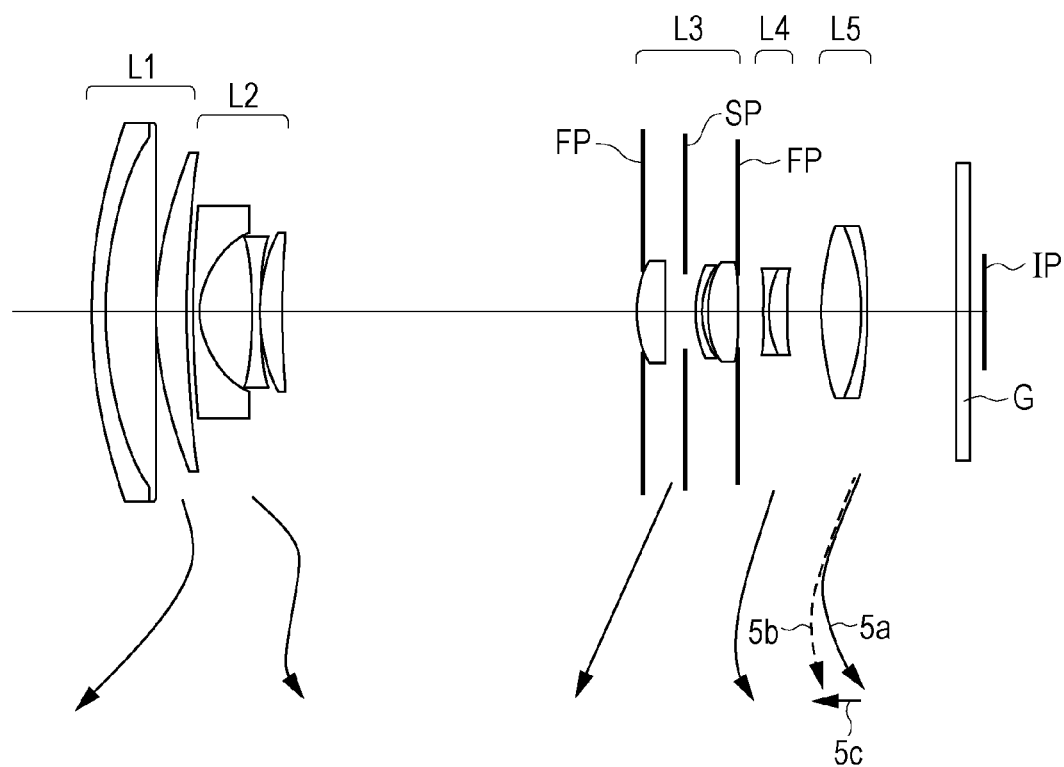
FIG. 5 is a cross-sectional view of a zoom lens at the wide-angle end, according to a third embodiment.
Figure 7:
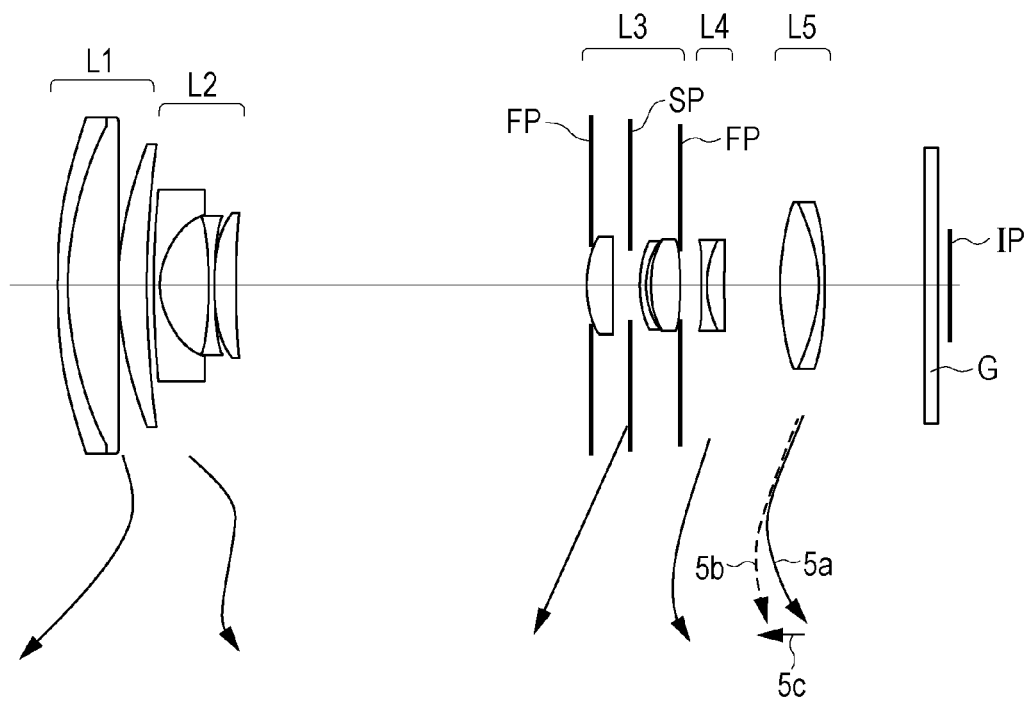
FIG. 7 is a cross-sectional view of a zoom lens at the wide-angle end, according to a fourth embodiment.

FIG. 5 is a cross-sectional view of the zoom lens of the third embodiment at the wide-angle end. FIGS. 6A, 6B, and 6C are aberration diagrams of the zoom lens of the third embodiment at the wide-angle end, the intermediate zooming position, and the telephoto end, respectively. The third embodiment is a zoom lens having a zoom ratio of 32.18 and an aperture ratio of about 3.20 to 7.10. FIG. 7 is a cross-sectional view of the zoom lens of the fourth embodiment at the wide-angle end. FIGS. 8A, 8B, and 8C are aberration diagrams of the zoom lens of the fourth embodiment at the wide-angle end, the intermediate zooming position, and the telephoto end, respectively. The fourth embodiment is a zoom lens having a zoom ratio of 27.94 and an aperture ratio of about 3.38 to 7.10.

Figure 9:
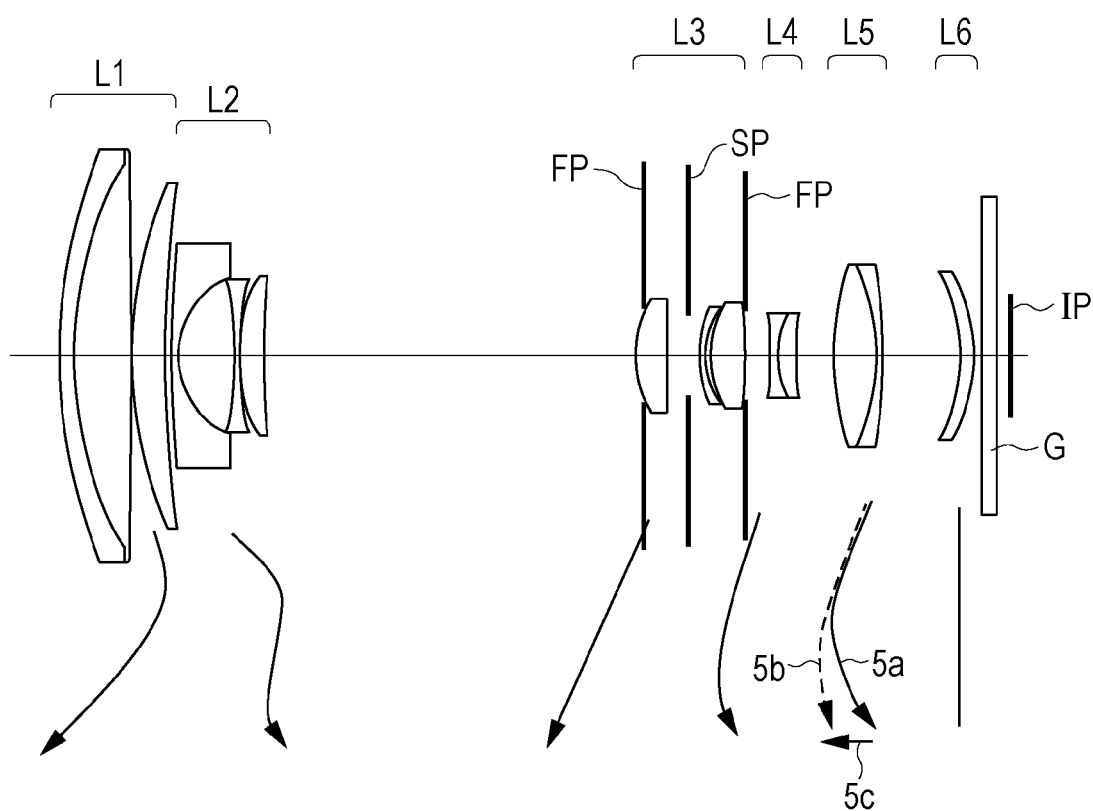
FIG. 9 is a cross-sectional view of a zoom lens at the wide-angle end, according to a fifth embodiment.

FIG. 9 is a cross-sectional view of the zoom lens of the fifth embodiment at the wide-angle end. FIGS. 10A, 10B, and 10C are aberration diagrams of the zoom lens of the fifth embodiment at the wide-angle end, the intermediate zooming position, and the telephoto end, respectively. The zoom lens of the fifth embodiment has a zoom ratio of 32.15 and an aperture ratio of about 3.18 to 7.10.

Figure 11:
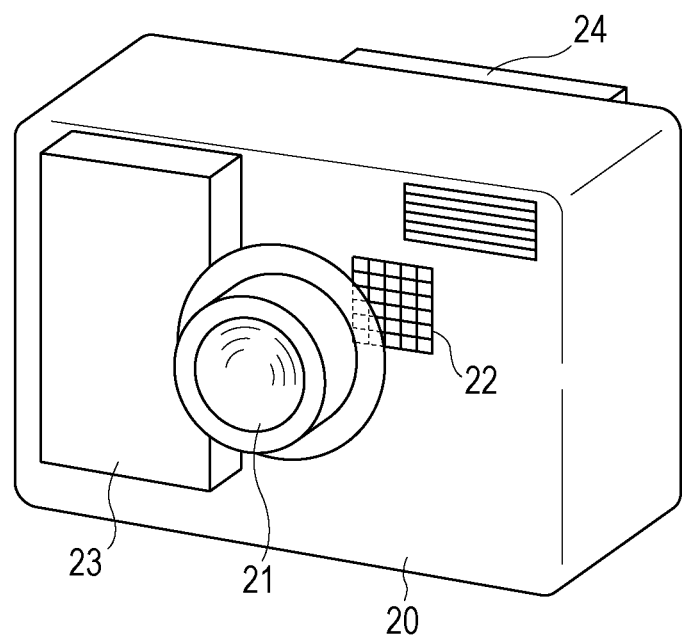
FIG. 11 is a schematic diagram of an image pickup apparatus according to an embodiment of the present invention.

FIG. 11 is a schematic diagram of a relevant part of a digital still camera (image pickup apparatus) including a zoom lens of an embodiment of the present invention. Zoom lenses according to the embodiments are image-taking lenses for use in image pickup apparatuses, such as a video camera, a digital still camera, a silver-halide film camera, and a TV camera.

The zoom lenses of the embodiments can also be used as a projection optical system for a projector. In the cross-sectional views, the left side of the figure is the object side (front), and the right side of the figure is the image side (rear) of the zoom lens. In the cross-sectional views, Li denotes an i-th lens unit, where i denotes the order of the lens unit from the object side to the image side.

In the embodiments, SP denotes an aperture stop, which moves with a third lens unit L3 in zooming. This allows the distance between a second lens unit L2 and the third lens unit L3 to be reduced at the telephoto end, thus decreasing the overall lens length. Reference sign FP denotes a flare stop, which is disposed at the object side and the image side of the third lens unit L3 to block undesirable light (flare).

Reference sign G denotes an optical block corresponding to an optical filter, a face plate, a low-pass filter, an infrared cut filter, or the like. Reference sign IP denotes an image plane. The image plane IP corresponds to a solid-state image sensor (photoelectric conversion element), such as a CCD sensor or a CMOS sensor, when the zoom lens is used as an image-pickup optical system of a video camera or a digital camera. When the zoom lens is used as an image-pickup optical system of a silver-halide film camera, the image plane IP corresponds to a film surface.

The aberration diagrams include spherical aberration, astigmatism, distortion, and chromatic aberration. In the spherical aberration diagrams, Fno denotes F-number, which indicates a spherical aberration for d-line (wavelength: 587.6 nm) and g-line (wavelength: 435.8 nm). In the astigmatism diagrams, $\Delta S$ denotes a sagittal image plane and $\Delta M$ denotes a meridional image plane. The distortion is for the d-line. The chromatic aberration diagrams show magnification chromatic aberrations for the g-line. Reference sign $\omega$ denotes a half angle of view for image capture. In the following embodiments, the wide-angle end and the telephoto end are zooming positions when lens units for varying magnification are located at both ends in a range in which the lens units can move on the optical axis under mechanical constraints.

In the embodiments, as indicated by arrows in the cross-sectional views, the lens units move during zooming from the wide-angle end toward the telephoto end to change the distance between the lens units. Specifically, in the embodiments, during zooming from the wide-angle end toward the telephoto end, the first lens unit L1 moves in a locus convex to the image side, and the third lens unit L3 moves toward the object side simply. During zooming from the wide-angle end toward the telephoto end, the second lens unit L2 moves toward the image side in a convex locus and thereafter moves while switching the locus to a convex locus toward the object side in an intermediate zoom range. Moving the second lens unit L2 in such a locus can decrease the distance between the second lens unit L2 and the third lens unit L3, thus allowing the overall lens length at the telephoto end to be decreased.

In the five-unit zoom lenses of the first to fourth embodiments, the fourth lens unit L4 moves so as to be located closer to the object side with respect to the image plane at the telephoto end than the wide-angle end. The fifth lens unit L5 moves toward the object side in a convex locus. In the six-unit zoom lens of the fifth embodiment, the fourth lens unit L4 moves so as to be located closer to the object side with respect to the image plane at the telephoto end than the wide-angle end. The fifth lens unit L5 moves toward the object side in a convex locus, and the sixth lens unit L6 does not move for zooming.

In the zoom lenses of the embodiments, the first lens unit L1 and the third lens unit L3 move for zooming so as to be located closer to the object side at the telephoto end than the wide-angle end. This can decrease the overall lens length at the wide-angle end and can decrease the diameter of the lens closest to the object side. In particular, allowing the third lens unit L3 to share the magnification varying operation by moving the third lens unit L3 toward the object side and moving the first lens unit L1 having positive refractive power toward the object side for zooming allows the second lens unit L2 to share the magnification varying operation greatly. This can provide a high-magnification zoom lens without excessively increasing the refractive power of the first lens unit L1 and the second lens unit L2.

Moving the fifth lens unit L5 on the optical axis allows focusing. For focusing from an object at infinity toward a nearby object at the telephoto end, the fifth lens unit L5 is moved as indicated by arrow 5c in the cross-sectional views. Solid lines 5a and dotted lines 5b in the cross-sectional views show moving loci for compensating fluctuations in image plane due to zooming from the wide-angle end toward the telephoto end during focusing to the object at infinity and the nearby object, respectively.

In the embodiments, an image blur is corrected by moving part or all of the third lens unit L3 so as to have a component perpendicular to the optical axis.

Next, the configurations of the individual lens units will be described. The first lens unit L1 consists of three lenses, a negative lens, a positive lens, and a positive lens in this order from the object side to the image side. This allows spherical aberration and chromatic aberration caused by high magnification to be corrected well.

The second lens unit L2 consists of three lenses, a negative lens, a negative lens, and a positive lens in this order from the object side to the image side.

The third lens unit L3 consists of a positive lens, a negative lens, and a positive lens in this order from the object side to the image side. Constituting the third lens unit L3 with three lenses can reduce the weight of the lens unit that is moved when correcting an image blur, thus allowing an image blur to be corrected well. Locating a positive lens closest to the object side of the third lens unit L3 allows spherical aberration to be corrected well in all zoom ranges. The configuration allows coma aberration in an intermediate zoom range to be corrected better than a configuration in which the third lens unit L3 is composed of a positive lens, a positive lens, and a negative lens in this order from the object side to the image side.

The fourth lens unit L4 is a cemented lens that consists of a negative lens and a positive lens in this order from the object side to the image side. This allows chromatic aberration in an intermediate zoom range to be corrected better than a configuration in which the fourth lens unit L4 is composed of a single lens, thus allowing fluctuations in chromatic aberration to be reduced.

The fifth lens unit L5 is a cemented lens that consists of a positive lens and a negative lens in this order from the object side to the image side. This allows chromatic aberration in an intermediate zoom range to be corrected well. This also reduces fluctuations in chromatic aberration involved with focusing.

For the six-unit zoom lens of the fifth embodiment, the sixth lens unit L6 is a positive single lens.

The embodiments satisfy the following conditional expressions:

$$0.05 < Tdw/ft < 0.55 \quad (1)$$

$$5.0 < f1/fw < 10.0 \quad (2)$$

$$-5.00 < M1/M2 < -0.05 \quad (3)$$

where Tdw is an overall lens length at the wide-angle end, M1 is the amount of movement of the first lens unit L1 during zooming from the wide-angle end toward the telephoto end, M2 is the amount of movement of the second lens unit L2 during the zooming, f1 is the focal length of the first lens unit L1, fw is the focal length of the entire system at the wide-angle end, and ft is the focal length of the entire system at the telephoto end.

The amounts of movement, M1 and M2, of the lens units L1 and L2 during zooming from the wide-angle end toward the telephoto end are differences in the position on the optical axis of the lens units L1 and L2 between the wide-angle end and the telephoto end, and the sign of the amounts of movement, M1 and M2, is positive when the lens unit is located closer to the object side at the telephoto end than the wide-angle end and is negative at the image side. The overall lens length is a value obtained by adding a back focus, expressed as a length in air, to a distance on the optical axis from the first lens surface to the last lens surface.

Conditional expression (1) defines the relationship between the overall lens length Tdw at the wide-angle end and the focal length ft of the entire system at the telephoto end. A decrease in the overall lens length Tdw at the wide-angle end to beyond the lower limit of conditional expression (1) needs to increase the refractive power of the lens units to obtain a high-magnification zoom lens. This disadvantageously makes it difficult to sufficiently correct chromatic aberration at the telephoto end and the curvature of field at the wide-angle end.

An increase in the overall lens length Tdw at the wide-angle end to beyond the upper limit of conditional expression (1) disadvantageously increases the overall lens length.

Conditional expression (2) defines the relationship between the focal length f1 of the first lens unit L1 and the focal length fw of the entire system at the wide-angle end. A decrease in the focal length f1 of the first lens unit L1 to beyond the lower limit of conditional expression (2) increases the refractive power of the first lens unit L1. This disadvantageously makes it difficult to sufficiently correct magnification chromatic aberration at the wide-angle end and axial chromatic aberration magnification chromatic aberration at the telephoto end. Furthermore, this makes it difficult to ensure a sufficient edge thickness of the positive lens in the first lens unit L1, which creates the need to increase the thickness of the lens. This disadvantageously increases the overall lens length.

An increase in the focal length f1 of the first lens unit L1 to beyond the upper limit of conditional expression (2) decreases the refractive power of the first lens unit L1. This requires an increase in the amount of movement M1 of the first lens unit L1 during zooming to obtain a high-magnification zoom lens, disadvantageously resulting in an increase in the overall lens length.

Conditional expression (3) defines the relationship between the amount of movement M1 of the first lens unit L1 and the amount of movement M2 of the second lens unit L2 during zooming from the wide-angle end toward the telephoto end. An increase in the amount of movement M1 of the first lens unit L1 to beyond the lower limit of conditional expression (3) disadvantageously increases the overall lens length.

A decrease in the amount of movement M1 of the first lens unit L1 to beyond the upper limit of conditional expression (3) needs to increase the refractive power of the first lens unit L1 to obtain a high magnification zoom lens. This disadvantageously makes it difficult to sufficiently correct chromatic aberration at the telephoto end.

In the embodiments, the elements are appropriately set so that conditional expressions (1), (2), (3) are satisfied, as described above. This allows a compact, high-magnification zoom lens having a good optical performance in all zoom ranges to be obtained.

In the embodiments, preferably, the numerical ranges of conditional expressions (1), (2), and (3) are set as follows:

$$0.10 < Tdw/ft < 0.54 \tag{1a}$$

$$5.5 \le f1/fw < 10.0 \tag{2a}$$

$$-4.90 < M1/M2 < -0.10 \tag{3a}$$

More preferably, the numerical ranges of conditional expressions (1), (2), and (3) are set as follows:

$$0.15 < Tdw/ft < 0.53 \tag{1b}$$

$$6.5 \le f1/fw < 10.0 \tag{2b}$$

$$-4.80 < M1/M2 < -0.15 \tag{3b}$$

Furthermore, more preferably, the embodiments satisfy one or more of the following conditional expressions are satisfied:

$$0.010 < |f2|/ft < 0.080 \tag{4}$$

$$0.010 < M1/ft < 0.190 \tag{5}$$

$$5.0 < \beta 2t/\beta 2w < 12.0 \tag{6}$$

$$2.0 \le f1/f3 < 5.0 \tag{7}$$

$$0.001 < d23t/ft < 0.100 \tag{8}$$

$$-1.00 < f3/f4 < 0.00 \tag{9}$$

where f2 is the focal length of the second lens unit L2, f3 is the focal length of the third lens unit L3, f4 is the focal length of the fourth lens unit L4, β2w and β2t are the lateral magnifications of the second lens unit L2 at the wide-angle end and the telephoto end, respectively, and d23t is the distance on the optical axis between the second lens unit L2 and the third lens unit L3 at the telephoto end (the distance on the optical axis from the surface of the second lens unit L2 closest to the image side to the surface of the third lens unit L3 closest to the object side).

Conditional expression (4) defines the relationship between the focal length f2 of the second lens unit L2 and the focal length ft of the entire system at the telephoto end. A decrease in the focal length f2 of the second lens unit L2 to beyond the lower limit of conditional expression (4) increases the refractive power of the second lens unit L2. This disadvantageously makes it difficult to correct coma aberration and fluctuations in image plane in an intermediate zoom range from the wide-angle end.

An increase in the focal length f2 of the second lens unit L2 to beyond the upper limit of conditional expression (4) decreases the refractive power of the second lens unit L2. This needs to increase the amount of movement M2 of the second lens unit L2 to obtain a high magnification zoom lens, disadvantageously resulting in an increase in the overall lens length.

Conditional expression (5) defines the relationship between the amount of movement M1 of the first lens unit L1 during zooming from the wide-angle end toward the telephoto end and the focal length ft of the entire system at the telephoto end. A decrease in the amount of movement M1 of the first lens unit L1 to beyond the lower limit of conditional expression (5) needs to increase the refractive power of the first lens unit L1 to obtain a high magnification zoom lens. This disadvantageously makes it difficult to sufficiently correct chromatic aberration at the telephoto end.

An increase in the amount of movement M1 of the first lens unit L1 to beyond the upper limit of conditional expression (5) disadvantageously increases the overall lens length.

Conditional expression (6) defines the relationship between the lateral magnification β2w of the second lens unit L2 at the wide-angle end and the lateral magnification β2t of the second lens unit L2 at the telephoto end. An increase in the ratio to beyond the lower limit of conditional expression (6) decreases the proportion of sharing the magnification varying operation of the second lens unit L2. This needs to increase the amount of movement M2 of the second lens unit L2 to obtain a high magnification zoom lens, thus disadvantageously increasing the overall lens length.

An increase in the ratio to beyond the upper limit of the conditional expression (6) increases the proportion of sharing the magnification varying operation of the second lens unit L2. This disadvantageously makes it difficult to correct coma aberration in all zoom ranges and a fluctuation in image plane during zooming.

Conditional expression (7) defines the relationship between the focal length f1 of the first lens unit L1 and the focal length f3 of the third lens unit L3. An increase in the focal length f3 of the third lens unit L3 to beyond the lower limit of conditional expression (7) decreases the refractive power of the third lens unit L3. This needs to increase the amount of movement of the third lens unit L3 to obtain a high magnification zoom lens, thus disadvantageously increasing the overall lens length.

A decrease in the focal length f3 of the third lens unit L3 to beyond the upper limit of conditional expression (7) increases the refractive power of the third lens unit L3. This disadvantageously makes it difficult to correct spherical aberration and axial chromatic aberration at the telephoto end.

Conditional expression (8) defines the relationship between the distance d23t on the optical axis between the second lens unit L2 and the third lens unit L3 at the telephoto end and the focal length ft of the entire system at the telephoto end. A decrease in the distance d23t on the optical axis between the second lens unit L2 and the third lens unit L3 at the telephoto end to beyond the lower limit of conditional expression (8) can disadvantageously cause interference with a holding member or the like that holds the lenses.

An increase in the distance d23t on the optical axis between the second lens unit L2 and the third lens unit L3 at the telephoto end to beyond the upper limit of conditional expression (8) disadvantageously increases the overall lens length.

Conditional expression (9) defines the relationship between the focal length f3 of the third lens unit L3 and the focal length f4 of the fourth lens unit L4. An increase in the focal length f3 of the third lens unit L3 to beyond the lower limit of conditional expression (9) decreases the refractive power of the third lens unit L3. This increases the amount of movement of the third lens unit L3 to obtain a high magnification zoom lens, thus disadvantageously increasing the overall lens length.

A decrease in the focal length f4 of the fourth lens unit L4 to beyond the lower limit of conditional expression (9) increases the refractive power of the fourth lens unit L4. This causes light to be diverged through the fourth lens unit L4 to increase the angle between an image plane and light incident on the image plane, thus disadvantageously causing much color shading.

The following settings for the numerical ranges of conditional expressions (4) to (9) maximize the effects of the conditional expressions.

$$0.010 < |f2|/ft < 0.060 \quad (4a)$$

$$0.015 < M1/ft < 0.180 \quad (5a)$$

$$6.0 < \beta 2t/\beta 2w < 11.0 \quad (6a)$$

$$2.5 < f1/f3 < 4.0 \quad (7a)$$

$$0.001 < d23t/ft < 0.008 \quad (8a)$$

$$-0.90 < f3/f4 < 0.00 \quad (9a)$$

The numerical ranges of conditional expressions (4) to (9) may also be set as follows:

$$0.020 < |f2|/ft < 0.055 \quad (4b)$$

$$0.020 < M1/ft < 0.180 \quad (5b)$$

$$8.5 < \beta 2t/\beta 2w < 11.0 \quad (6b)$$

$$3.0 < f1/f3 < 3.9 \quad (7b)$$

$$0.002 < d23t/ft < 0.007 \quad (8b)$$

$$-0.85 < f3/f4 < 0.00 \quad (9b)$$

Next, numerical examples 1 to 5 corresponding to the first to fifth embodiments, respectively, will now be described. In the numerical examples, reference sign i denotes the order of the optical surface counted from the object side, ri denotes the radius of curvature of an i-th optical surface (i-th surface), di denotes the distance between the i-th surface and an i+1 surface, and ndi and vdi denote respectively the refractive index and Abbe number of the material of an i-th optical element for d-line.

For aspherical surfaces, an aspherical shape x, with a displacement along the optical axis from a surface vertex at a height h from the optical axis, is expressed as:

$$x = (h^2/R)/[1 + [1 - (1+k)(h/R)^2]^{1/2}] + A4h^4 + A6h^6 + A8h^8,$$

where k is eccentricity, A4, A6, and A8 are aspherical coefficients, and R is the radius of paraxial curvature. The expression "e-Z" denotes "$10^{-Z}$". In the numerical examples, two surfaces closest to the image side are surfaces of an optical block, such as a filter or a face plate.

In the numerical examples, back focus (BF) is a distance from the surface of the lens system closest to the image side to a paraxial image plane, expressed as a length in air. Table 1 shows the correlation between the numerical examples and the conditional expressions described above.

The diameter of an effective image circle at the wide-angle end can be smaller than the diameter of an effective image circle at the telephoto end. This is because barrel distortion, which tends to occur at the wide angle end, can be corrected by expanding the image by image processing.

NUMERICAL EXAMPLE 1 in mm

Surface data

| Surface number | r | d | nd | vd |
|---|---|---|---|---|
| 1 | 40.488 | 0.90 | 1.84666 | 23.9 |
| 2 | 27.413 | 3.48 | 1.49700 | 81.5 |
| 3 | −1396.007 | 0.05 | | |
| 4 | 27.911 | 2.09 | 1.60311 | 60.6 |
| 5 | 86.272 | (Variable) | | |
| 6 | 154.261 | 0.45 | 1.83481 | 42.7 |
| 7 | 6.269 | 3.65 | | |
| 8 | −21.815 | 0.35 | 1.83481 | 42.7 |
| 9 | 21.815 | 0.05 | | |
| 10 | 13.237 | 1.70 | 1.95906 | 17.5 |
| 11 | 106.482 | (Variable) | | |
| 12 | ∞ | −0.50 | | |
| 13* | 7.234 | 2.10 | 1.49710 | 81.6 |
| 14* | −199.138 | 1.34 | | |
| 15 (Aperture) | ∞ | 0.76 | | |
| 16 | 8.180 | 0.40 | 1.84666 | 23.9 |
| 17 | 5.343 | 0.42 | | |
| 18* | 7.846 | 2.20 | 1.49710 | 81.6 |
| 19* | −47.001 | 0.00 | | |
| 20 | ∞ | (Variable) | | |
| 21 | −26.975 | 0.40 | 1.77250 | 49.6 |
| 22 | 6.416 | 1.35 | 1.69895 | 30.1 |
| 23 | 25.915 | (Variable) | | |
| 24 | 20.007 | 2.90 | 1.83481 | 42.7 |
| 25 | −14.903 | 0.40 | 1.92286 | 18.9 |
| 26 | −41.483 | (Variable) | | |
| 27 | ∞ | 1.00 | 1.51633 | 64.1 |
| 28 | ∞ | 1.00 | | |

Aspherical surface data

13th surface

K = −2.88215e−001 A4 = 1.28893e−006 A6 = −6.29316e−006
A8 = −5.63728e−007

14th surface

K = 1.96107e+003 A4 = 3.61806e−004 A6 = −2.68335e−005

18th surface

K = −1.14104e+000 A4 = 1.02915e−003 A6 = −4.22350e−005
A8 = −2.18430e−008

19th surface

K = 0.00000e+000 A4 = 5.50949e−004 A6 = −3.75122e−005
A8 = −3.14285e−007

Data
Zoom ratio 28.41

| Focal length | 4.63 | 7.35 | 16.24 | 70.86 | 131.62 |
|---|---|---|---|---|---|
| F-number | 3.29 | 3.74 | 4.66 | 5.71 | 7.10 |
| Angle of view | 35.73 | 26.84 | 13.42 | 3.13 | 1.69 |
| Image height | 3.33 | 3.72 | 3.88 | 3.88 | 3.88 |
| Overall lens length | 64.50 | 62.97 | 68.98 | 84.60 | 85.77 |
| BF | 8.82 | 11.83 | 17.61 | 14.76 | 5.31 |
| d5 | 0.57 | 4.12 | 12.01 | 26.53 | 29.17 |
| d11 | 26.40 | 18.00 | 9.66 | 1.94 | 0.90 |
| d20 | 1.75 | 1.70 | 2.08 | 7.16 | 6.52 |
| d23 | 2.47 | 2.83 | 3.12 | 9.72 | 19.37 |
| d26 | 7.16 | 10.17 | 15.95 | 13.10 | 3.65 |

Zoom lens unit data

| Unit | First surface | Focal length |
|---|---|---|
| 1 | 1 | 43.32 |
| 2 | 6 | −6.84 |
| 3 | 12 | 11.67 |
| 4 | 21 | −14.67 |
| 5 | 24 | 17.60 |

NUMERICAL EXAMPLE 2 in mm

Surface data

| Surface number | r | d | nd | vd |
|---|---|---|---|---|
| 1 | 38.868 | 0.90 | 1.84666 | 23.9 |
| 2 | 26.679 | 3.60 | 1.49700 | 81.5 |
| 3 | −2720.515 | 0.05 | | |
| 4 | 28.174 | 2.20 | 1.60311 | 60.6 |
| 5 | 83.192 | (Variable) | | |
| 6 | 82.613 | 0.45 | 1.83481 | 42.7 |
| 7 | 5.873 | 3.80 | | |
| 8 | −20.425 | 0.35 | 1.83481 | 42.7 |
| 9 | 20.425 | 0.05 | | |
| 10 | 12.635 | 1.70 | 1.95906 | 17.5 |
| 11 | 101.842 | (Variable) | | |
| 12 | ∞ | −0.50 | | |
| 13* | 7.002 | 2.10 | 1.49710 | 81.6 |
| 14* | −59.115 | 1.34 | | |
| 15 (Aperture) | ∞ | 0.76 | | |
| 16 | 8.034 | 0.40 | 1.84666 | 23.9 |
| 17 | 5.135 | 0.42 | | |
| 18* | 8.027 | 2.20 | 1.49710 | 81.6 |
| 19* | −59.754 | 0.00 | | |
| 20 | ∞ | (Variable) | | |
| 21 | −23.576 | 0.40 | 1.77250 | 49.6 |
| 22 | 6.762 | 1.35 | 1.69895 | 30.1 |
| 23 | 37.986 | (Variable) | | |
| 24 | 19.904 | 2.90 | 1.83481 | 42.7 |
| 25 | −13.939 | 0.40 | 1.92286 | 18.9 |
| 26 | −41.146 | (Variable) | | |
| 27 | ∞ | 1.00 | 1.51633 | 64.1 |
| 28 | ∞ | 1.00 | | |
| Image plane | ∞ | | | |

Aspherical surface data

13th surface

K = −4.03252e−001 A4 = 1.24062e−004 A6 = −7.75484e−006
A8 = −5.68110e−007

14th surface

K = −4.41432e+002 A4 = 3.35069e−004 A6 = −2.87630e−005

18th surface

K = −5.19192e−001 A4 = 1.21163e−003 A6 = −7.90248e−005
A8 = 7.55341e−007

19th surface

K = 0.00000e+000 A4 = 7.00885e−004 A6 = −6.25617e−005
A8 = −1.54134e−007

Data
Zoom ratio 30.21

| Focal length | 4.36 | 6.97 | 15.56 | 69.89 | 131.64 |
|---|---|---|---|---|---|
| F-number | 3.22 | 3.67 | 4.61 | 5.74 | 7.10 |
| Angle of view | 37.41 | 28.10 | 13.99 | 3.17 | 1.69 |
| Image height | 3.33 | 3.72 | 3.88 | 3.88 | 3.88 |
| Overall lens length | 62.28 | 60.93 | 67.34 | 84.49 | 85.90 |
| BF | 7.84 | 10.77 | 16.52 | 14.73 | 5.30 |
| d5 | 0.38 | 4.02 | 12.04 | 26.84 | 29.52 |
| d11 | 25.11 | 16.95 | 8.99 | 1.90 | 0.90 |
| d20 | 1.75 | 1.70 | 2.06 | 6.96 | 6.29 |
| d23 | 2.33 | 2.61 | 2.85 | 9.19 | 19.03 |
| d26 | 6.18 | 9.11 | 14.86 | 13.07 | 3.64 |

Zoom lens unit data

| Unit | First surface | Focal length |
|---|---|---|
| 1 | 1 | 43.50 |
| 2 | 6 | −6.50 |
| 3 | 12 | 11.43 |
| 4 | 21 | −15.90 |
| 5 | 24 | 17.60 |

NUMERICAL EXAMPLE 3 in mm

Surface data

| Surface number | r | d | nd | vd |
|---|---|---|---|---|
| 1 | 38.226 | 0.90 | 1.84666 | 23.9 |
| 2 | 26.471 | 3.60 | 1.49700 | 81.5 |
| 3 | −1945.600 | 0.05 | | |
| 4 | 28.395 | 2.20 | 1.60311 | 60.6 |
| 5 | 81.845 | (Variable) | | |
| 6 | 87.060 | 0.45 | 1.83481 | 42.7 |
| 7 | 5.899 | 3.80 | | |
| 8 | −20.821 | 0.35 | 1.83481 | 42.7 |
| 9 | 20.821 | 0.05 | | |
| 10 | 12.662 | 1.70 | 1.95906 | 17.5 |
| 11 | 89.146 | (Variable) | | |
| 12 | ∞ | −0.50 | | |
| 13* | 6.801 | 2.10 | 1.49710 | 81.6 |
| 14* | −49.264 | 1.34 | | |
| 15 (Aperture) | ∞ | 0.76 | | |
| 16 | 8.168 | 0.40 | 1.84666 | 23.9 |
| 17 | 5.095 | 0.42 | | |
| 18* | 8.150 | 2.20 | 1.49710 | 81.6 |
| 19* | −94.380 | 0.00 | | |
| 20 | ∞ | (Variable) | | |
| 21 | −22.149 | 0.40 | 1.77250 | 49.6 |
| 22 | 6.009 | 1.35 | 1.69895 | 30.1 |
| 23 | 48.306 | (Variable) | | |
| 24 | 19.904 | 2.90 | 1.83481 | 42.7 |
| 25 | −13.594 | 0.40 | 1.92286 | 18.9 |
| 16 | −40.853 | (Variable) | | |
| 27 | ∞ | 1.00 | 1.51633 | 64.1 |
| 28 | ∞ | 1.00 | | |
| Image plane | ∞ | | | |

Aspherical surface data

13th surface

K = −2.82324e−001 A4 = 8.03641e−005 A6 = −1.24773e−006
A8 = −2.53490e−007

14th surface

K = −2.73434e+001 A4 = 5.65331e−004 A6 = −2.13127e−005

18th surface

K = −9.23351e−001 A4 = 1.08155e−003 A6 = −3.83559e−005
A8 = −4.16495e−006

19th surface

K = 0.00000e+000 A4 = 4.88306e−004 A6 = −4.46606e−005
A8 = −3.24338e−006

Data
Zoom ratio 32.18

| Focal length | 4.35 | 6.94 | 15.50 | 72.11 | 139.99 |
|---|---|---|---|---|---|
| F-number | 3.20 | 3.65 | 4.60 | 5.70 | 7.10 |
| Angle of view | 37.45 | 28.19 | 14.04 | 3.08 | 1.59 |
| Image height | 3.33 | 3.72 | 3.88 | 3.88 | 3.88 |
| Overall lens length | 62.90 | 61.54 | 67.93 | 84.99 | 86.39 |
| BF | 7.89 | 10.78 | 16.52 | 15.59 | 5.29 |
| d5 | 0.41 | 4.06 | 12.10 | 26.96 | 29.65 |
| d11 | 25.81 | 17.64 | 9.60 | 1.99 | 0.90 |
| d20 | 1.75 | 1.70 | 2.03 | 6.71 | 6.00 |
| d23 | 2.17 | 2.49 | 2.81 | 8.86 | 19.68 |

-continued

| in mm | | | | | |
|---|---|---|---|---|---|
| d26 | 6.23 | 9.12 | 14.86 | 13.94 | 3.63 |

| Zoom lens unit data | | |
|---|---|---|
| Unit | First surface | Focal length |
| 1 | 1 | 43.40 |
| 2 | 6 | −6.50 |
| 3 | 12 | 11.57 |
| 4 | 21 | −16.04 |
| 5 | 24 | 17.60 |

NUMERICAL EXAMPLE 4

| in mm | | | |
|---|---|---|---|
| Surface data | | | |
| Surface number | r | d | nd | vd |
| 1 | 39.003 | 0.90 | 1.84666 | 23.9 |
| 2 | 26.853 | 3.80 | 1.49700 | 81.5 |
| 3 | −1393.836 | 0.05 | | |
| 4 | 27.837 | 2.20 | 1.60311 | 60.6 |
| 5 | 76.987 | (Variable) | | |
| 6 | 105.756 | 0.45 | 1.83481 | 42.7 |
| 7 | 6.113 | 3.80 | | |
| 8 | −21.150 | 0.35 | 1.83481 | 42.7 |
| 9 | 21.150 | 0.05 | | |
| 10 | 12.889 | 1.70 | 1.95906 | 17.5 |
| 11 | 134.196 | (Variable) | | |
| 12 | ∞ | −0.50 | | |
| 13* | 7.316 | 2.10 | 1.49710 | 81.6 |
| 14* | −84.419 | 1.34 | | |
| 15 (Aperture) | ∞ | 0.76 | | |
| 16 | 8.199 | 0.40 | 1.84666 | 23.9 |
| 17 | 5.087 | 0.42 | | |
| 18* | 8.531 | 2.20 | 1.49710 | 81.6 |
| 19* | −109.040 | 0.00 | | |
| 20 | ∞ | (Variable) | | |
| 21 | −22.631 | 0.40 | 1.77250 | 49.6 |
| 22 | 7.467 | 1.35 | 1.69895 | 30.1 |
| 23 | 756.603 | (Variable) | | |
| 24 | 24.270 | 2.90 | 1.83481 | 42.7 |
| 25 | −12.844 | 0.40 | 1.92286 | 18.9 |
| 26 | −33.181 | (Variable) | | |
| 27 | ∞ | 1.00 | 1.51633 | 64.1 |
| 28 | ∞ | 1.00 | | |
| Image plane | ∞ | | | |

Aspherical surface data

13th surface

K = −2.22323e−001 A4 = 2.15637e−004 A6 = −1.68855e−006
A8 = −1.73831e−007
14th surface K = −5.20277e+002 A4 = 6.42911e−004 A6 = −2.18219e−005
18th surface K = −9.25190e−001 A4 = 1.11005e−003 A6 = −4.52650e−005
A8 = −4.69699e−006
19th surface K = 0.00000e+000 A4 = 2.96495e−004 A6 = −5.37697e−005
A8 = −3.43529e−006

| Data Zoom ratio 27.94 | | | | | |
|---|---|---|---|---|---|
| Focal length | 4.71 | 7.28 | 15.24 | 71.19 | 131.62 |
| F-number | 3.38 | 3.70 | 4.32 | 5.67 | 7.10 |

-continued

| in mm | | | | | |
|---|---|---|---|---|---|
| Angle of view | 35.27 | 27.06 | 14.27 | 3.12 | 1.69 |
| Image height | 3.33 | 3.72 | 3.88 | 3.88 | 3.88 |
| Overall lens length | 68.43 | 67.04 | 73.37 | 90.22 | 91.58 |
| BF | 9.37 | 11.80 | 16.56 | 16.84 | 7.43 |
| d5 | 0.52 | 4.12 | 12.04 | 26.45 | 29.06 |
| d11 | 27.41 | 18.97 | 10.49 | 2.07 | 0.90 |
| d20 | 1.70 | 2.11 | 3.33 | 10.67 | 10.32 |
| d23 | 4.36 | 4.98 | 5.88 | 9.13 | 18.79 |
| d26 | 7.71 | 10.14 | 14.90 | 15.18 | 5.77 |

| Zoom lens unit data | | |
|---|---|---|
| Unit | First surface | Focal length |
| 1 | 1 | 43.74 |
| 2 | 6 | −6.91 |
| 3 | 12 | 13.32 |
| 4 | 21 | −22.21 |
| 5 | 24 | 18.50 |

NUMERICAL EXAMPLE 5

| in mm | | | |
|---|---|---|---|
| Surface data | | | |
| Surface number | r | d | nd | vd |
| 1 | 37.451 | 0.90 | 1.84666 | 23.9 |
| 2 | 25.778 | 3.80 | 1.49700 | 81.5 |
| 3 | −1013.903 | 0.05 | | |
| 4 | 27.958 | 2.20 | 1.60311 | 60.6 |
| 5 | 82.604 | (Variable) | | |
| 6 | 88.536 | 0.45 | 1.83481 | 42.7 |
| 7 | 5.709 | 3.80 | | |
| 8 | −19.785 | 0.35 | 1.83481 | 42.7 |
| 9 | 19.785 | 0.05 | | |
| 10 | 12.271 | 1.70 | 1.95906 | 17.5 |
| 11 | 100.103 | (Variable) | | |
| 12 | ∞ | −0.50 | | |
| 13* | 7.216 | 2.10 | 1.49710 | 81.6 |
| 14* | −38.908 | 1.34 | | |
| 15 (Aperture) | ∞ | 0.76 | | |
| 16 | 7.942 | 0.40 | 1.84666 | 23.9 |
| 17 | 5.056 | 0.42 | | |
| 18* | 8.016 | 2.20 | 1.49710 | 81.6 |
| 19* | −62.823 | 0.00 | | |
| 20 | ∞ | (Variable) | | |
| 21 | −27.161 | 0.40 | 1.77250 | 49.6 |
| 22 | 6.182 | 1.35 | 1.69895 | 30.1 |
| 23 | 30.566 | (Variable) | | |
| 24 | 18.968 | 2.90 | 1.83481 | 42.7 |
| 25 | −13.831 | 0.40 | 1.92286 | 18.9 |
| 26 | −45.451 | (Variable) | | |
| 27 | −12.725 | 1.00 | 1.51633 | 64.1 |
| 28 | −11.480 | 0.46 | | |
| 29 | ∞ | 1.00 | 1.51633 | 64.1 |
| 30 | ∞ | 1.00 | | |
| Image plane | ∞ | | | |

Aspherical surface data

13th surface

K = −3.23201e−001 A4 = 5.01652e−005 A6 = −7.97668e−006
A8 = −7.26346e−007
14th surface K = 3.80739e+001 A4 = 7.07513e−004 A6 = −3.71831e−005

-continued in mm

18th surface

K = −1.61230e−002 A4 = 1.37402e−003 A6 = −5.25649e−005
A8 = −3.59959e−007

19th surface

K = 0.00000e+000 A4 = 8.61308e−004 A6 = −4.12336e−005
A8 = −1.17425e−006

Data
Zoom ratio 32.15

| Focal length | 4.35 | 7.00 | 15.96 | 72.01 | 140.00 |
|---|---|---|---|---|---|
| F-number | 3.18 | 3.61 | 4.60 | 5.65 | 7.10 |
| Angle of view | 37.43 | 27.98 | 13.65 | 3.08 | 1.59 |
| Image height | 3.33 | 3.72 | 3.88 | 3.88 | 3.88 |
| Overall lens length | 62.63 | 61.26 | 67.62 | 84.55 | 85.92 |
| BF | 2.12 | 2.12 | 2.12 | 2.12 | 2.12 |
| d5 | 0.41 | 3.98 | 11.86 | 26.07 | 28.65 |
| d11 | 24.90 | 16.82 | 8.97 | 1.91 | 0.90 |
| d20 | 1.75 | 1.70 | 2.03 | 6.71 | 6.00 |
| d23 | 2.35 | 2.50 | 2.50 | 9.12 | 19.86 |
| d26 | 5.03 | 8.06 | 14.06 | 12.53 | 2.31 |

Zoom lens unit data

| Unit | First surface | Focal length |
|---|---|---|
| 1 | 1 | 42.11 |
| 2 | 6 | −6.26 |
| 3 | 12 | 11.33 |
| 4 | 21 | −15.59 |
| 5 | 24 | 17.60 |
| 6 | 27 | 178.38 |

TABLE 1

| | Example 1 | Example 2 | Example 3 | Example 4 | Example 5 |
|---|---|---|---|---|---|
| Tdw/ft | 0.490 | 0.473 | 0.449 | 0.520 | 0.447 |
| f1/fw | 9.35 | 9.98 | 9.98 | 9.28 | 9.67 |
| M1/M2 | −2.90 | −4.29 | −4.08 | −4.30 | −4.70 |
| |f2|/ft | 0.052 | 0.049 | 0.046 | 0.052 | 0.045 |
| M1/ft | 0.162 | 0.179 | 0.168 | 0.176 | 0.166 |
| β2t/β2w | 9.54 | 9.88 | 10.63 | 9.14 | 10.42 |
| f1/f3 | 3.71 | 3.81 | 3.75 | 3.28 | 3.72 |
| d23t/ft | 0.003 | 0.003 | 0.003 | 0.003 | 0.003 |
| f3/f4 | −0.80 | −0.72 | −0.72 | −0.60 | −0.73 |

Next, an example of a digital still camera that uses a zoom lens of any of the embodiments of the present invention as an image-pickup optical system will now be described with reference to FIG. 11. In FIG. 11, reference sign 20 denotes a camera body, 21 denotes an image-pickup optical system, which is one of the zoom lenses described in Numerical examples 1 to 5, 22 denotes a solid-state image sensor (photoelectric conversion element), such as a CCD sensor or a CMOS sensor, that is built in the camera body 20 and receives an image of a subject formed by the image-pickup optical system 21 (zoom lens), 23 denotes a memory that stores image information corresponding to a subject image photoelectrically converted by the solid-state image sensor 22, and 24 denotes a viewfinder, for example, a liquid-crystal display panel, for observing a subject image formed on the solid-state image sensor 22. The application of the zoom lens of the present invention to an image sensor of a digital still camera allows a compact, high-magnification image pickup apparatus having high optical performance in all zoom ranges to be provided.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2013-176641, filed Aug. 28, 2013, which is hereby incorporated by reference herein in its entirety.

What is claimed is:

1. A zoom lens comprising, in order from an object side to an image side, a first lens unit having positive refractive power, a second lens unit having negative refractive power, a third lens unit having positive refractive power, a fourth lens unit having negative refractive power, and a fifth lens unit having positive refractive power, wherein at least the first lens unit, the second lens unit, and the third lens unit move during zooming so that the first lens unit is located closer to an object side, the second lens unit is located closer to an image side, and the third lens unit is located closer to the object side at a telephoto end than a wide-angle end, wherein the following conditional expressions are satisfied:

$0.05 < Tdw/ft < 0.55$ $5.0 < f1/fw < 10.0$ $-5.00 < M1/M2 < -0.05$ where Tdw is an overall lens length at the wide-angle end, M1 is the amount of movement of the first lens unit during zooming from the wide-angle end toward the telephoto end, M2 is the amount of movement of the second lens unit during zooming from the wide-angle end toward the telephoto end, f1 is the focal length of the first lens unit, fw is the focal length of the entire lens at the wide-angle end, and ft is the focal length of the entire lens at the telephoto end; and the sign of the amounts of movement of the lens units is positive when the lens units are moved to be located closer to the object side at the telephoto end than the wide-angle end, and is negative when the lens units are moved to be located closer to the image side at the telephoto end than the image side.

2. The zoom lens according to claim 1, wherein the following conditional expression is satisfied:

$0.010 < |f2|/ft < 0.080$ where f2 is the focal length of the second lens unit.

3. The zoom lens according to claim 1, wherein the following conditional expression is satisfied:

$0.010 < M1/ft < 0.190$

4. The zoom lens according to claim 1, wherein the following conditional expression is satisfied:

$5.0 < β2t/β2w < 12.0$ where β2w is the lateral magnification of the second lens unit at the wide-angle end, and β2t is the lateral magnification of the second lens unit at the telephoto end.

5. The zoom lens according to claim 1, wherein the following conditional expression is satisfied:

$2.0 < f1/f3 < 5.0$ where f3 is the focal length of the third lens unit.

6. The zoom lens according to claim 1, wherein the following conditional expression is satisfied:

$0.001 < d23t/ft < 0.100$ where d23t is the distance on an optical axis between the second lens unit and the third lens unit at the telephoto end.

7. The zoom lens according to claim 1, wherein the following conditional expression is satisfied:

$$-1.0<f3/f4<0.00$$

where f3 is the focal length of the third lens unit, and f4 is the focal length of the fourth lens unit.

8. The zoom lens according to claim 1, wherein the third lens unit includes a lens having positive refractive power, a lens having negative refractive power, and a lens having positive refractive power in this order from the object side to the image side.

9. The zoom lens according to claim 1, wherein the fourth lens unit is a cemented lens including a lens having negative refractive power and a lens having positive refractive power in this order from the object side to the image side.

10. The zoom lens according to claim 1, wherein the fifth lens unit is a cemented lens including a lens having positive refractive power and a lens having negative refractive power in this order from the object side to the image side.

11. The zoom lens according to claim 1, further comprising a sixth lens unit having positive refractive power at the image side with respect to the fifth lens unit.

12. An image pickup apparatus comprising:
a zoom lens; and
an image sensor configured to receive an image formed by the zoom lens,
wherein the zoom lens comprises, in order from an object side to an image side:
a first lens unit having positive refractive power, a second lens unit having negative refractive power, a third lens unit having positive refractive power, a fourth lens unit having negative refractive power, and a fifth lens unit having positive refractive power;
wherein at least the first lens unit, the second lens unit, and the third lens unit move during zooming so that the first lens unit is located closer to an object side, the second lens unit is located closer to an image side, and the third lens unit is located closer to the object side at a telephoto end than a wide-angle end; and
wherein the following conditional expressions are satisfied:

$$0.05<Tdw/ft<0.55$$

$$5.0<f1/fw<10.0$$

$$-5.00<M1/M2<-0.05$$

where Tdw is an overall lens length at the wide-angle end, M1 is the amount of movement of the first lens unit during zooming from the wide-angle end toward the telephoto end, M2 is the amount of movement of the second lens unit during zooming from the wide-angle end toward the telephoto end, f1 is the focal length of the first lens unit, fw is the focal length of the entire lens at the wide-angle end, and ft is the focal length of the entire lens at the telephoto end; and the sign of the amounts of movement of the lens units is positive when the lens units are moved to be located closer to the object side at the telephoto end than the wide-angle end, and is negative when the lens units are moved to be located closer to the image side at the telephoto end than the image side.

* * * * *